US005823165A

United States Patent [19]

Sato et al.

[11] Patent Number: 5,823,165

[45] Date of Patent: Oct. 20, 1998

[54] VALVE ACTUATOR ARRANGEMENT FOR INTERNAL COMBUSTION ENGINE

[75] Inventors: Hisaaki Sato, Gunma; Masato Kumagai, Saitama; Munehiro Kudo; Keiichi Kai, both of Gunma, all of Japan

[73] Assignee: Unisia Jecs Corporation, Atsugi, Japan

[21] Appl. No.: 803,881

[22] Filed: Feb. 21, 1997

[30] Foreign Application Priority Data

Feb. 23, 1996 [JP] Japan .................................... 8-036911
Jun. 11, 1996 [JP] Japan .................................... 8-171868
Jun. 11, 1996 [JP] Japan .................................... 8-171869

[51] Int. Cl.$^{6}$ ............................. F02D 41/00; F16K 31/02

[52] U.S. Cl. .................... 123/399; 123/361; 251/129.11; 310/156; 310/268

[58] Field of Search .................................... 123/399, 361, 123/400; 251/129.11, 65; 310/152, 156, 36, 268

[56] References Cited

U.S. PATENT DOCUMENTS

| | | | |
|---|---|---|---|
| 3,912,956 | 10/1975 | Muller | 310/68 C |
| 4,322,666 | 3/1982 | Muller | 318/254 |
| 4,330,727 | 5/1982 | Oudet | 310/268 |
| 4,361,776 | 11/1982 | Hayashi et al. | 310/268 |
| 4,409,940 | 10/1983 | Gaus | 123/361 |
| 4,601,271 | 7/1986 | Ejiri et al. | 123/361 |
| 4,850,322 | 7/1989 | Uthoff et al. | 123/399 |
| 4,915,074 | 4/1990 | Arai | 123/399 |
| 5,113,824 | 5/1992 | Haubner | 123/399 |
| 5,131,364 | 7/1992 | Mann | 123/399 |

FOREIGN PATENT DOCUMENTS

| | | |
|---|---|---|
| 4-234539 | 8/1992 | Japan . |
| 4-234540 | 8/1992 | Japan . |
| 5-149154 | 6/1993 | Japan . |

*Primary Examiner*—Tony M. Argenbright
*Assistant Examiner*—Hieu T. Vo
*Attorney, Agent, or Firm*—Foley & Lardner

[57] ABSTRACT

In a valve actuator arrangement for an internal combustion engine, a valve structure having a valve body and a rotary valve axle is provided, an electric motor structure having a generally disc shaped body fixed on one end of said valve axle so as to be integrally pivoted with the valve axle is provided, a permanent magnet fixed on the disc-shaped body is provided, a fixing member fixed on the one end of the valve axle is provided, and a pair of windings to form a pair of coils whose winding directions are mutually opposite to each other are wound around the fixing member so that a direction of a magnetic flux developed between each of the pair of windings and the permanent magnet is parallel to the valve axle.

23 Claims, 21 Drawing Sheets

FIG.3A
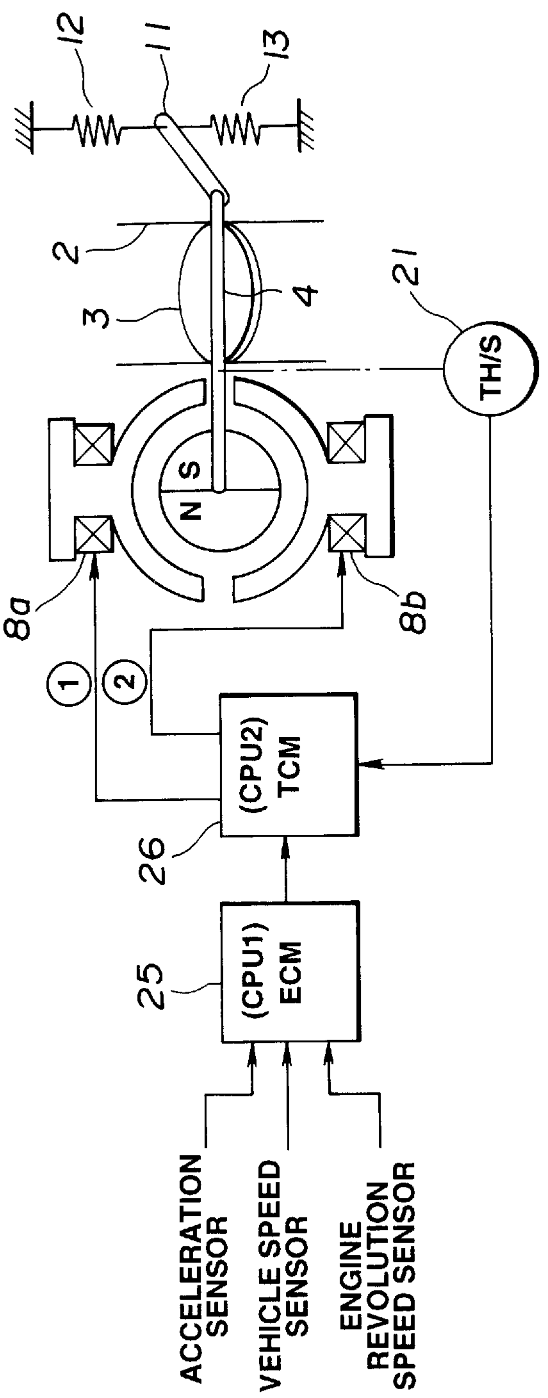
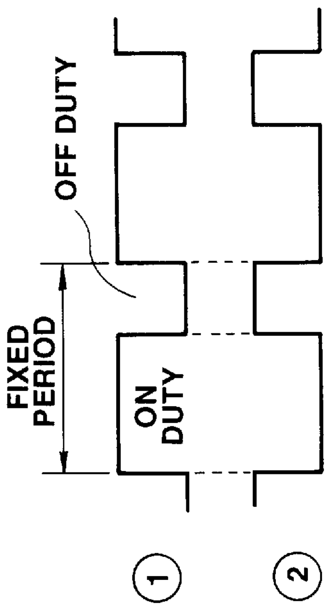
FIG.3B
FIG.3C

VALVE ACTUATOR ARRANGEMENT FOR INTERNAL COMBUSTION ENGINE

BACKGROUND OF THE INVENTION

The present invention relates to a valve actuator arrangement for an internal combustion engine, particularly, to an electronically controlled throttle valve actuator arrangement or electrically controlled idling valve actuator arrangement in which a specially designed electric motor is directly coupled to a valve axle of a valve body.

Japanese Patent Application First Publications (non-examined) No. Heisei 5-149154, No. Heisei 4-234539 and No. Heisei 4-234540 exemplify previously proposed valve actuator arrangements.

In each of the previously proposed valve actuator arrangements disclosed in a corresponding one of the above-identified Japanese Patent Application First Publications, a permanent magnet is attached onto a valve axle of a valve and at least one coil is arranged around the magnet so that a direction of a magnetic flux developed between the magnet and the coil is perpendicular to an axial direction of the valve axle. Hence, the magnet and coil needs to be large sized in the direction of the valve axle or in the outer diameter direction of the valve axle in order to secure a magnetic flux area. Consequently, a part constituting a motor becomes large sized in the valve axle direction or outer diameter direction.

In addition, in each of the previously proposed valve actuator arrangements described above, the valve is fully closed if a power supply to the coil is turned off due to a failure. Hence, it becomes difficult to run (so called, a limp home run) if the valve is an electronically controlled throttle valve.

SUMMARY OF THE INVENTION

It is therefore an object of the present invention to provide a valve actuator arrangement for an internal combustion engine which can achieve a small sized actuator arrangement in a direction parallel to a rotary valve axle on which a valve body is attached and can assure at least a limp home run when a power supply is interrupted.

According to one aspect of the present invention, there is provided with a valve actuator arrangement for an internal combustion engine, comprising: a valve structure having a valve body and a rotary valve axle; an electric motor structure having a generally disc shaped body fixed on one end of said valve axle so as to be integrally pivoted with said valve axle; a permanent magnet fixed on said disc-shaped body; a fixing member fixed on the one end of said valve axle; and a pair of windings to form a pair of coils whose winding directions are mutually opposite to each other and wound around said fixing member so that a direction of a magnetic flux developed between each of said pair of windings and said permanent magnet is parallel to said valve axle.

BRIEF DESCRIPTION OF THE DRAWINGS

FIG. 3A is an electrically explanatory view of the valve actuator arrangement shown in FIG. 1 for explaining a basic operation principle of the valve actuator arrangement of the first embodiment shown in FIG. 1A.

FIGS. 3B and 3C are timing charts for explaining each pulse duty ratio of pulse train signals supplied to the respective windings forming a pair of electromagnetic coils shown in FIG. 3A.

BEST MODE FOR CARRYING OUT THE INVENTION

Reference will hereinafter be made to the drawings in order to facilitate a better understanding of the present invention.

First Embodiment

Figure 1A:
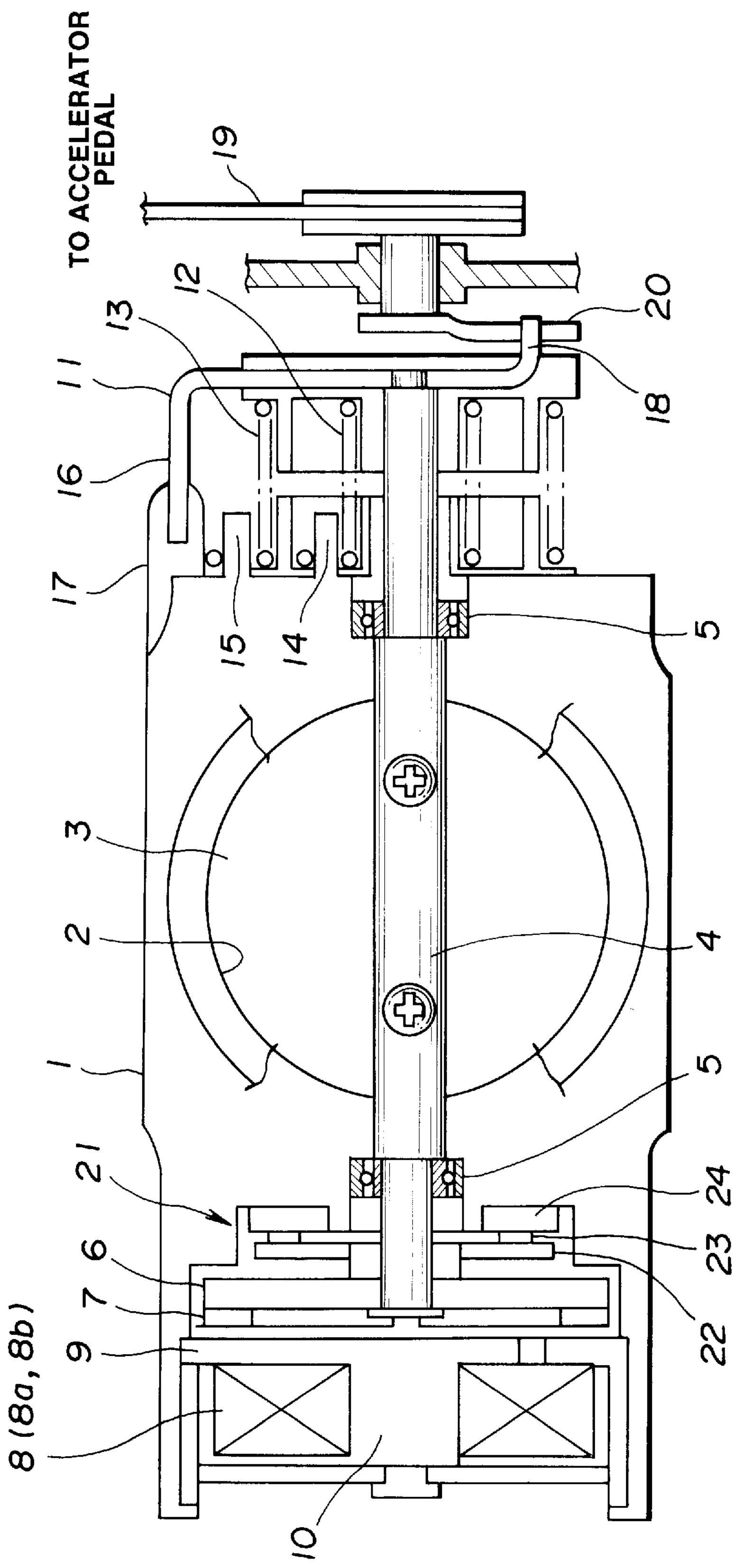
FIG. 1A is a schematic partial cross sectional view of a throttle valve and a throttle chamber in an intake air passage of an internal combustion engine to which a first preferred embodiment of a valve actuator arrangement according to the present invention is applicable.
Figure 1B:
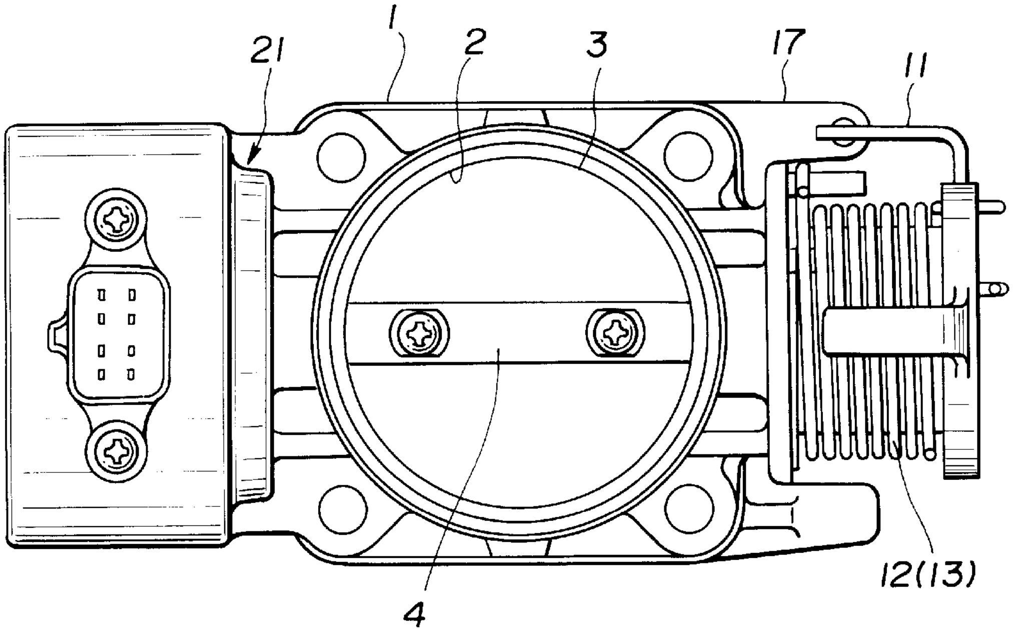
FIGS. 1B and 1C are top and side views of the valve actuator arrangement, respectively, in the first embodiment shown in FIG. 1A
Figure 1C:
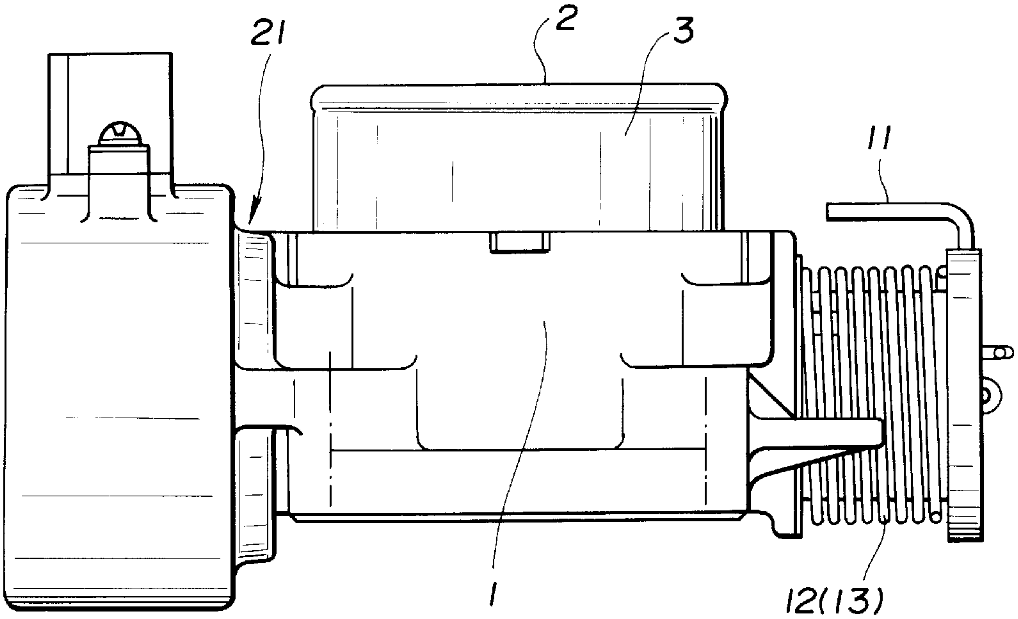

FIGS. 1A, 1B, and 1C show a first preferred embodiment of a valve actuator arrangement which is used in an electronically controlled (engine) throttle valve (apparatus) to which the present invention is applicable.

In FIG. 1A, a butterfly type throttle valve body 3 is disposed within a throttle chamber 1 constituting an intake air passage 2. Both ends of a valve (rotary) axle 4 of the throttle valve body (the valve axle 4 is fixed on a generally disc-shaped valve body at a diameter section crossing a center of the valve body 3) are rotatably (pivotally) supported by means of bearings 5 and are penetrated through respective side walls of the throttle chamber 1.

An actuator constituted by a motor is connected to one end of the valve axle 4.

Figure 2A:
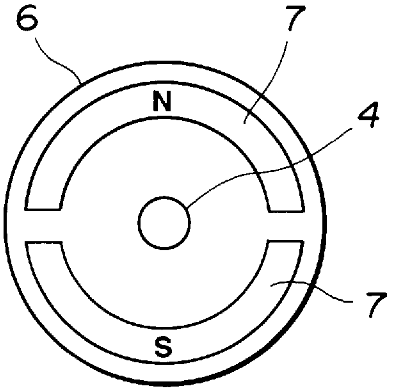
FIG. 2A is a schematic side view of a permanent magnet and a magnet attached disc-shaped body assembled in the valve actuator arrangement shown in FIG. 1A.

In details, a disc-shaped body 6 is attached onto the one end of the valve axle 4 and a permanent magnet 7 is fixed on (a surface of) the disc-shaped body 6. The permanent magnet 7 is formed with a pair of an N magnetic pole and an S magnetic pole, each being formed of a semicircular arc shape as shown in FIG. 2A.

Figure 2B:
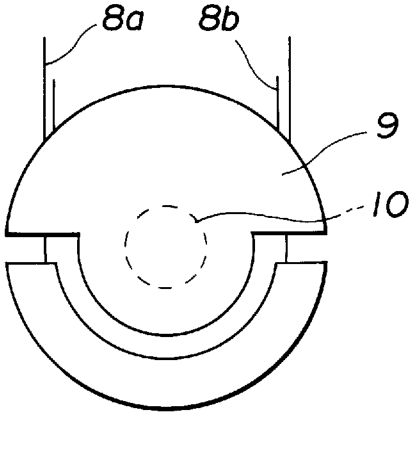
FIG. 2B is a schematic side view of a pair of windings assembled in the valve actuator arrangement shown in FIG. 1A.

A pair of windings (constituting electromagnetic coils) 8 (8*a*, 8*b*) are attached onto a fixing member (or side wall portions of the throttle chamber 1) so that a direction of a magnetic flux developed between each of the pair of windings 8 and the magnet 7 is parallel to (an elongated direction) the valve axle 4. Specifically, as shown in FIG. 2B, a core (body) 9 having a plate surface eccentrically arranged with respect to an axle 10 of the core 9 so as to magnetically face with the permanent magnet 7. The pair of windings 8*a* and 8*b* include, wound on the axle portion 10 of the core 9, a valve opening coil 8*a* and a valve closing coil 8*b* whose winding direction is opposite to that of the valve opening coil 8*a*.

An arm-shaped throttle lever 11 is attached on the other end of the valve axle 4.

The throttle lever 11 includes two twisted mutually opposite directionally wound coil springs 12 and 13, each one end thereof being engaged on the side wall portion of the throttle chamber 1 and each of the other ends thereof being engaged on a corresponding one of the engagement pins 14 and 15 projected from the side wall portion of the throttle chamber 1.

In this way, the two springs 12 and 13 are acted upon in both of the valve opening direction and the valve closing direction so that a neutral position due to a balance of both of biasing forces exerted by the two springs 12 and 13 is set.

It is noted that the neutral position is set at a position to slightly open the valve body 3 rather than the full close position. A stopper 17 is projected from the side wall portion of the throttle chamber 1 so as to limit a pivotal movement range of a stopper piece 16 projected from the throttle lever 11.

It is noted that there are two stoppers 17, one for limiting the pivotal movement range up to the fully closed position and the other for limiting the pivotal movement up to the fully open position and FIG. 1A shows only the one of the stoppers 17.

In addition, an engagement piece 18 is projected from the throttle lever 11 and a limp home lever 20 interlocked with an accelerator element such as an accelerator (gas) pedal (not shown in FIG. 1A) via an accelerator wire 19. Both of the limp home lever 20 and the engagement piece 18 of the throttle lever 11 are engageable with a play. That is to say, even if the limp home lever 20 is moved in a normal accelerator depression angle range of the accelerator element. However, if the throttle lever 11 is placed at the full close position in a range of the play, the limp home lever 20 is not engaged with the engagement piece 18. In addition, the limp home lever 20 is pivoted through an angle exceeding or equal to the neutral position of the throttle lever 11 in a position placed in the vicinity to a fully depressed position of the accelerator element.

A throttle (opening angle) sensor 21 constituted by a potensiometer is incorporated into the throttle chamber 1 so as to output a signal corresponding to a pivotal movement position of the valve axle 4. The throttle sensor 21 includes a movable contact 23 installed on a rotor 22 attached around the valve axle 4, the movable contact 23 being slided on a resistance body on a fixed substrate 24 to output a voltage (analog) signal corresponding to the pivotal movement of the valve axle 4.

FIG. 3A is a circuit block diagram of the electronically controlled throttle valve for explaining a basic operation principle of the valve actuator arrangement in the first embodiment shown in FIG. 1A.

FIGS. 3B and 3C are timing charts for explaining pulse train signals to be supplied to the pair of windings 8*a* and 8*b*, respectively.

A first (engine) control unit (module) ECM 25 having a CPU1 and used to control engine driving parameters (for example, fuel injection timing and quantity, air-fuel mixture ratio, and so on) receives signals from an accelerator sensor (not shown), a vehicle speed sensor, an engine revolution speed sensor, and so on) and, calculates a target opening angle of the throttle valve 3, and outputs a signal corresponding to the target opening angle.

A throttle control unit (module) 26 (also called, a traction control module (TCM)) receives the output signal from the engine control unit (module) 25 indicating the target throttle (valve) opening angle, and feeds back an actual opening angle detected by the throttle sensor 21.

The throttle (valve) control unit (module) 26 calculates a duty ratio (%) of the pulse train signal to be supplied to each of the pair of windings (8*a* or 8*b*) on the basis of the received target throttle (valve) opening angle and actual opening angle to control the duty ratio (%) of the corresponding one of the respective pulse train signals in a feedback control mode. Specifically, when the target throttle (valve) opening angle is compared with the actual throttle (valve) opening angle and, for example, when the actual throttle (valve) opening angle is smaller than the target opening angle, the duty ratio (on duty) for the valve opening winding 8*a* of the pair of windings 8 is increased. If the opening angle duty ratio (%) is set, the pulse train signal having the on duty (an on time duration) and off duty (an off time duration) is outputted to the valve opening winding 8*a* and the pulse train signal having the on duty and off duty which are reversed from the pulse train signal for the valve opening winding 8*a* is outputted to the valve closing winding 8*b*. This can be appreciated from FIGS. 3B and 3C. It is noted that FIG. 3B exemplifies the pulse train signal for the valve opening winding 8*a* and FIG. 3C exemplifies the pulse train signal for the valve closing winding 8*b* and a period of each pulse train signal is constant (a frequency of each of the pulse train signals is, for example, 300 Hz).

This continuously causes the drives of the throttle valve (3) to be repeated at a ratio corresponding to the valve opening duty (%) so that the throttle valve opening angle is adjusted to provide the valve opening duty ratio.

Since, according to the present invention, the direction of the magnetic flux extending in an aerial gap between the permanent magnet 7 and each of the pair of windings 8 is parallel to the elongated (axial) direction of the valve axle 4, a magnetic flux area is secured according to a setting of a size of the disc-shaped body 6 to achieve a sufficient torque for the valve axle 4. Consequently, a small sized valve actuator can be achieved due to a shortening in the direction of the valve axle 4.

In addition, in a case where the power supply to the control units (modules) 25 and 26 due to a power supply failure so that no pulse train signal is supplied to each of the pair of windings 8, the throttle valve body 3 is stopped at the neutral position at which the biasing forces of both valve opening and valve closing springs 12 and 13 are balanced. A predetermined opening angle is achieved at the neutral position so that an engine stalling can be prevented from occurring avoiding an overrun of the engine revolution speed.

Furthermore, in the same case as described above, the accelerator element (pedal) is operated at the position placed in the vicinity to the full open position so that the limp home lever 20 is engaged with the throttle lever 11 which is placed at the neutral position. Thus, the throttle valve 3 can be operated in the open direction so that a manual control for the throttle valve 3 through the accelerator element can be made to some degree and a limp home run during the failure is be facilitated.

Figure 4:
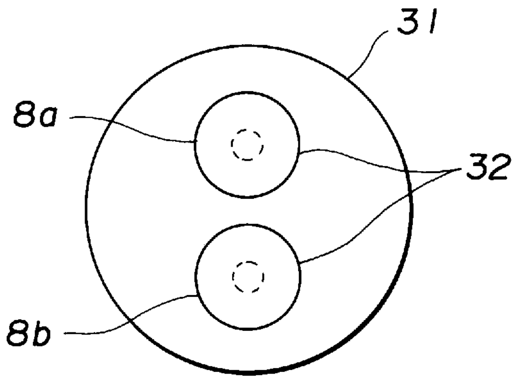
FIG. 4 is a schematic side view of a first modification of the first embodiment on the pair of windings wound around a pair of core members attached onto a fixing member.

FIG. 4 shows a first modification of the first embodiment. That is to say, although the pair of windings 8 are constituted as shown in FIG. 2A, two separate cores 32 are disposed on an alternative fixed disc-shaped body 31, around one of the cores 32 the valve opening one 8*a* of the pair of windings 8 is wound and around the other of the cores 32 the valve closing one 8*b* of the pair of windings 8 is wound.

Figure 5:
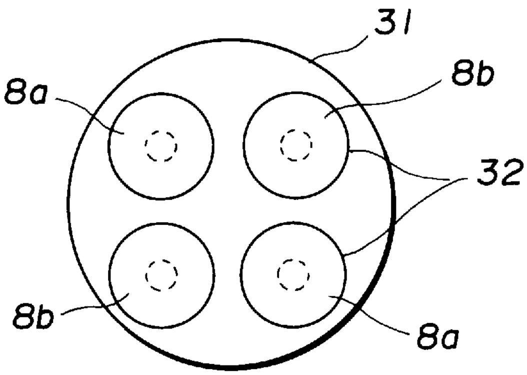
FIG. 5 is a schematic side view of a second modification of the first embodiment on the pair of windings each wound on a pair of core members symmetrically extended on the fixing member.

FIG. 5 shows a second modification of the first embodiment.

Since the number of windings of the pair of windings cannot be increased any more in the first modification case of FIG. 4, four cores 32 are disposed on the first disc-shaped body 31, the valve opening one 8*a* of the pair of windings 8 is wound on the two of the cores 32 on one orthogonal line, and the valve closing one 8*b* of the pair of windings 8 is wound on the other two of the cores 32 on the other orthogonal line. During the power supply reception (receipt of the respective pulse train signals), one of the two cores on which the valve opening one of the pair of windings provides the N pole, the other of the two cores providing the S pole. During the same case, one of the other two cores on which the valve closing one of the pair of windings provides the N pole, the other of the other two cores providing the S pole.

Second Embodiment

In the case of the first embodiment shown in FIG. 1A, the pair of windings 8 are arranged against one surface of the permanent magnet 7.

Thus, an attracting force between the permanent magnet 7 and the pair of windings 8 to form the pair of electromagnetic coils acts upon the valve axle 4 in a thrust direction thereof.

Figure 8:
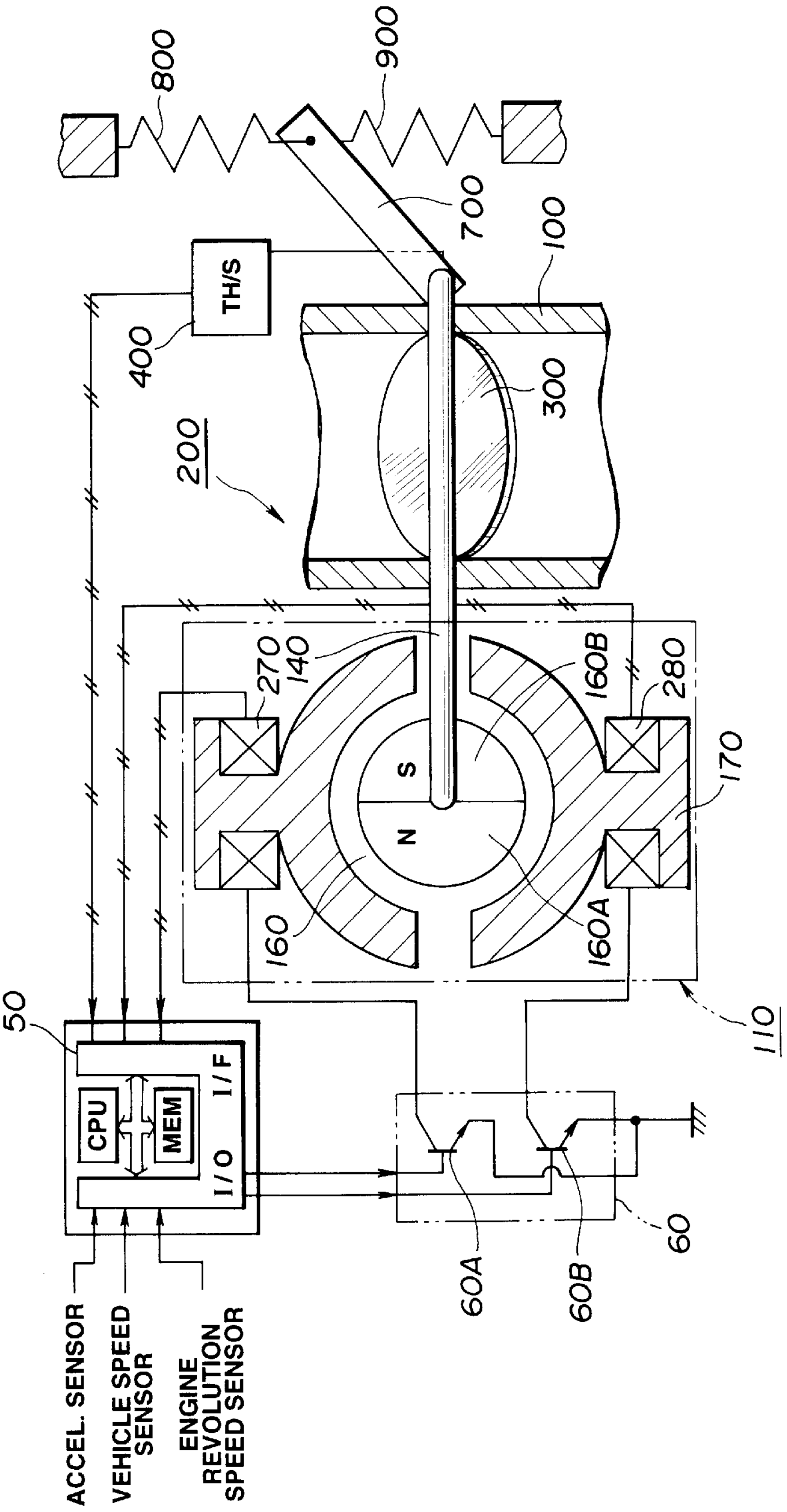
FIG. 8 is an electrically schematic explanatory view of the valve actuator arrangement (a rotary-type electromagnetic actuator) in a third preferred embodiment for explaining a basic operation principle of the valve actuator arrangement in the third embodiment.

In a second embodiment shown in FIG. 8, the pair of windings 8 to form the pair of coils are arranged against both surfaces of the permanent magnet 7 so as to be interposed between the pair of windings 8.

Figure 6:
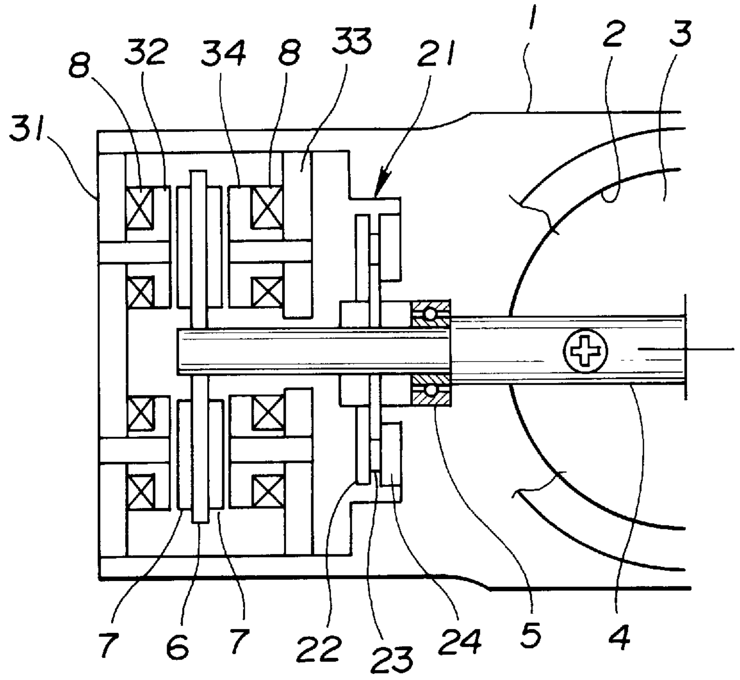
FIG. 6 is a partial cross sectional view of the valve actuator arrangement in a second preferred embodiment according to the present invention.

It is noted that the other structure than the above-described arrangement on the pair of windings 8 and permanent magnet 7 shown in FIG. 6 is the same as that described in the first embodiment.

Figure 7A:
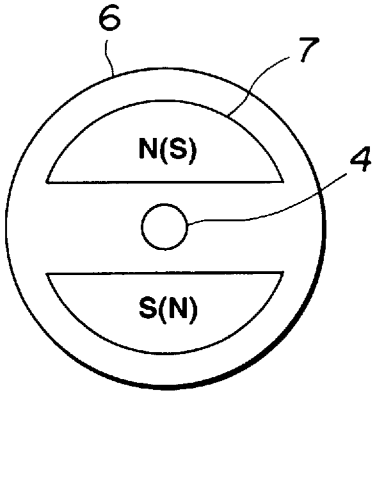
FIGS. 7A and 7B are schematic side views of (FIG. 7A) the permanent magnet and one surface of the disc-shaped body shown in FIG. 6 and (FIG. 7B) of the pair of windings and a plurality of core members on one surface of the fixing member around each core member of which one of the pair of windings is wound, respectively.

FIG. 7A shows a structure of the permanent magnet 7 used in the second embodiment shown in FIG. 6.

That is to say, the permanent magnet 7 includes an upper N pole portion having a semicircular shape and a lower N pole portion having the same semicircular shape, both N pole and S pole portions being formed on one surface of the disc-shaped body 6. It is noted that, as shown in FIG. 6, the other permanent magnet 7 includes a lower N pole portion having the same semicircular shape and an upper S pole portion having the same semicircular shape, both N pole and S pole portions being formed on the other surface of the disc-shaped body 6.

Figure 7B:
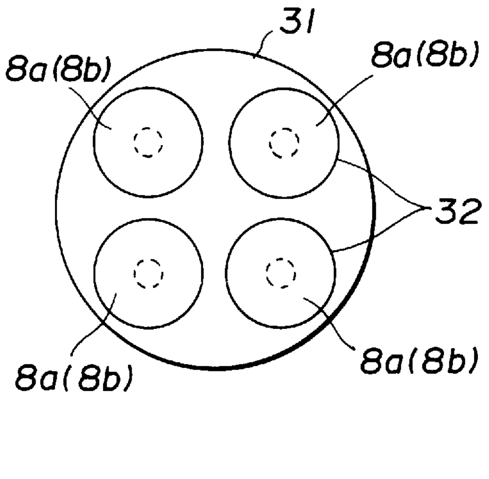

FIG. 7B shows the structure of the pair of windings 8 (8*a*) used in the second embodiment shown in FIG. 6.

The pair of windings 8 are arranged against both surfaces of the magnet 7 so that the direction of the magnetic flux developed between the pair of windings 8 and the magnet 7 is parallel to the direction of the valve axle 4.

Specifically, the fixed disc-shaped body 31 is attached onto one surface of the magnet 7. Thus, four cores 34 are extended from the surface of the disc-shaped body 31, around each of the four cores 34 the valve opening one 8*a* of the pair of windings 8 being wound so that the adjacent two of the cores 32 on which the valve opening one 8*a* is wound and which are upper as viewed from FIG. 7B provide the N pole and the remaining two thereof on which the valve opening one 8*a* is wound and which are lower as viewed from FIG. 7B provide the S pole.

It is noted that, as shown in FIG. 6, the other disc-shaped body 33 is disposed against the other surface of the magnet 7 and four cores 34 are extended from the other disc-shaped body 33, around each of the four cores 34 the valve closing one 8*b* of the pair of windings being wound so that the adjacent two of the cores 32 on which the valve closing one 8*b* are wound and which are upper as viewed from FIG. 7B provide N pole and the remaining two thereof on which the valve closing one 8*b* is wound and which are lower as viewed from FIG. 7B provide the S pole.

Third Embodiment

FIGS. 8 through 18 show a rotary-type electromagnetic actuator as the valve actuator arrangement in a third preferred embodiment according to the present invention.

FIG. 8 shows an explanatory view of the valve actuator arrangement including a traction control unit (module) 50 (corresponds to the TCM 25 in the first embodiment) and a transistor drive circuit 60 (having two transistors 60A and 60B) for explaining an operation of the rotary-type electromagnetic actuator 110 in the third embodiment.

Figure 9:
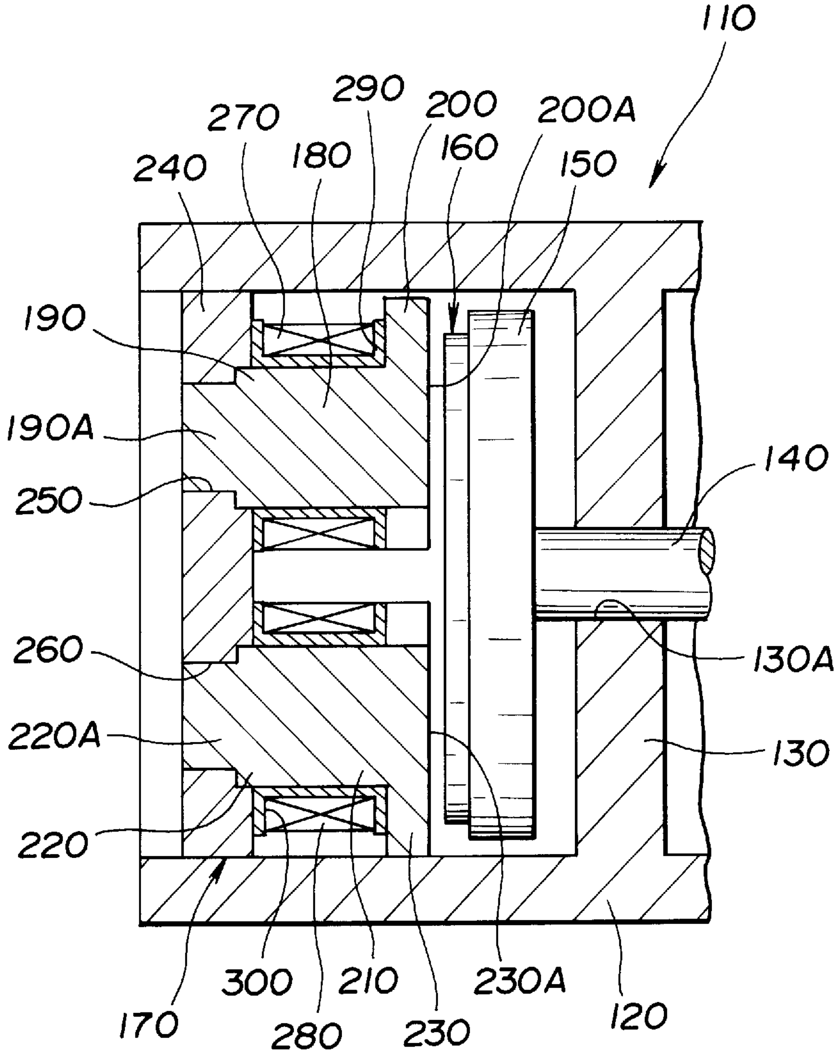
FIG. 9 is a partial and longitudinal cross sectional view of the valve actuator arrangement in the third embodiment according to the present invention.

FIG. 9 shows a structure in a cylindrical casing constituting an outer shape of the rotary-type electromagnetic actuator 110.

Figure 10:
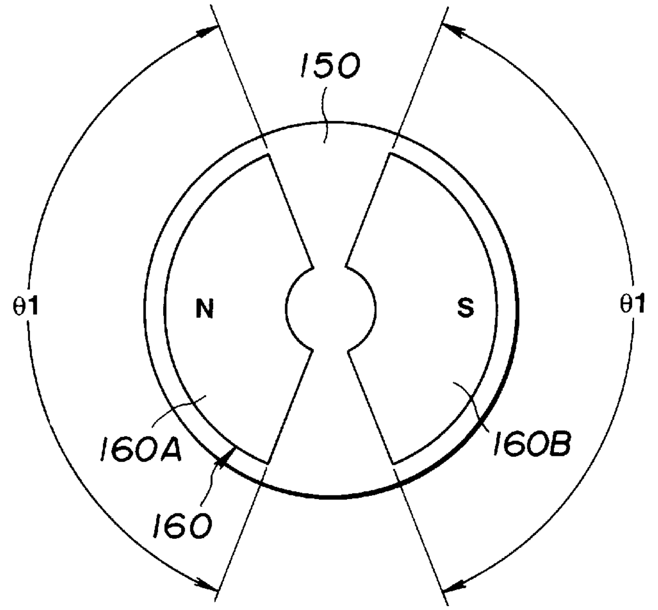
FIG. 10 is a schematic front view representing a shape of the permanent magnet used in the valve actuator arrangement shown in FIG. 9.

FIG. 10 shows a structure of the permanent magnet 160 on the disc-shaped body 150 used in the third embodiment.

Figure 11:
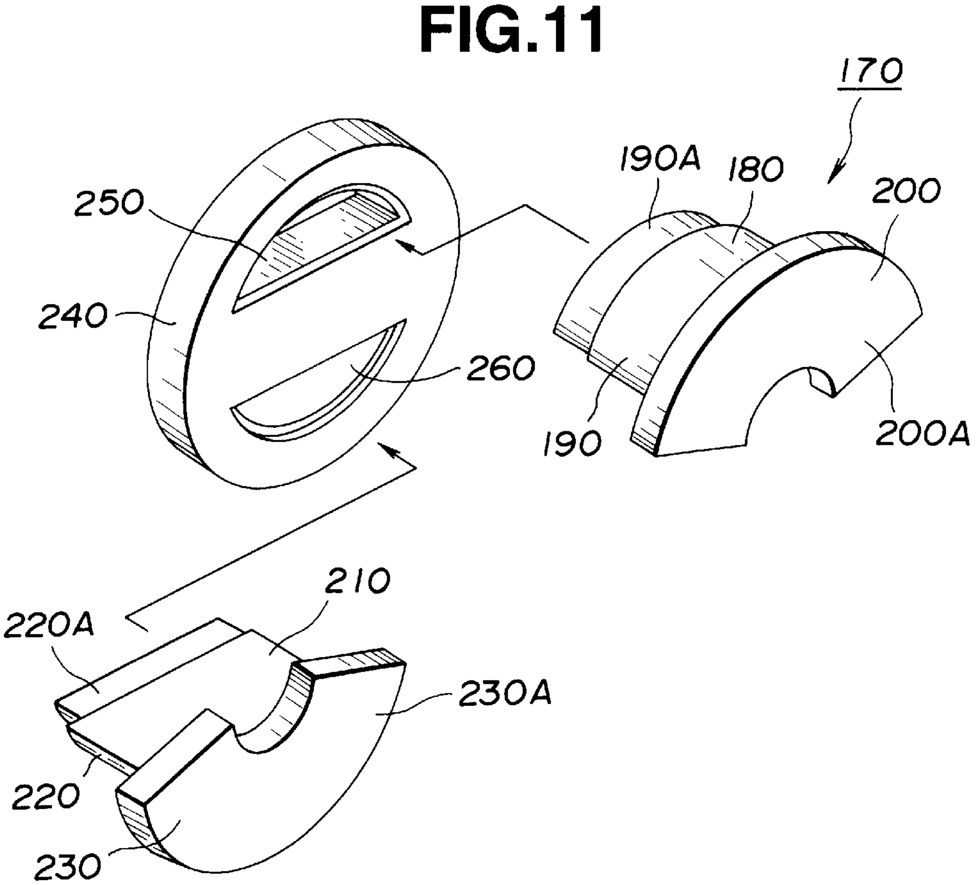
FIG. 11 is a perspectively projected and exploded view of the core member used in the valve actuator arrangement in the third embodiment shown in FIG. 9.

FIG. 11 shows a structure of a (magnetic) core member 170 used in the third embodiment.

Figure 12:
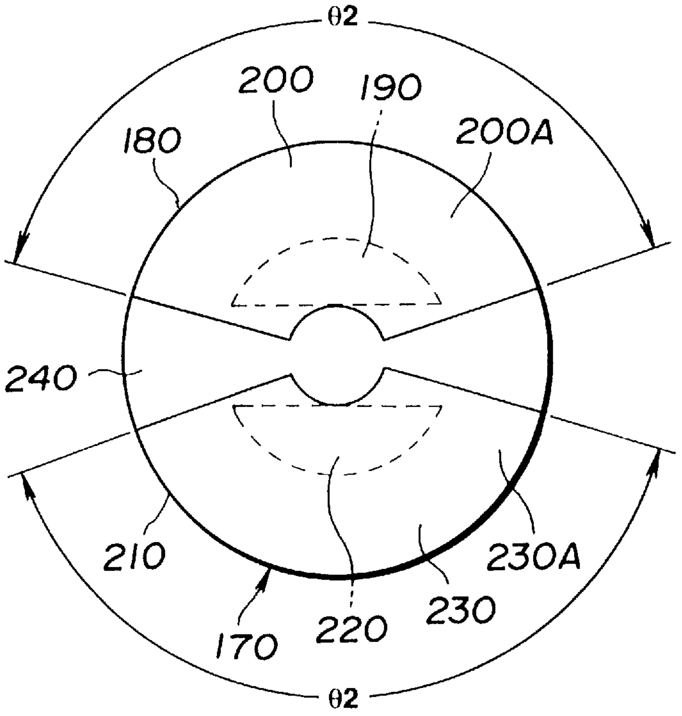
FIG. 12 is a schematic front view representing an arc-shaped body in first and second bar-shaped core members constituting the core member shown in FIG. 11.

FIG. 12 shows a structure of the core member 170 used in the third embodiment.

Figure 13:
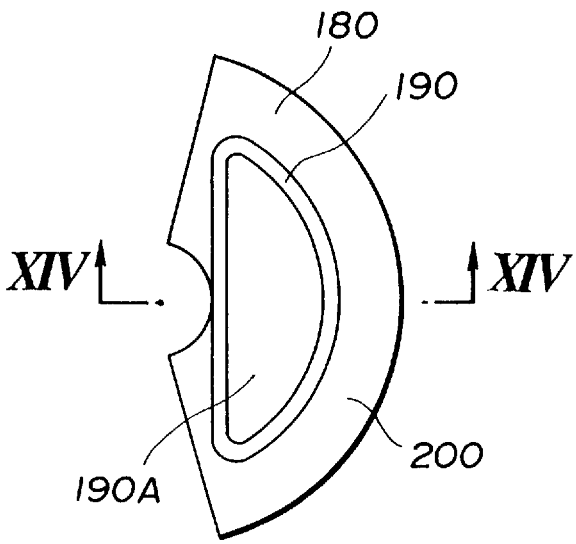
FIG. 13 is a schematic plan view representing the first bar-shaped core constituting the core member shown in FIG. 11.
Figure 14:
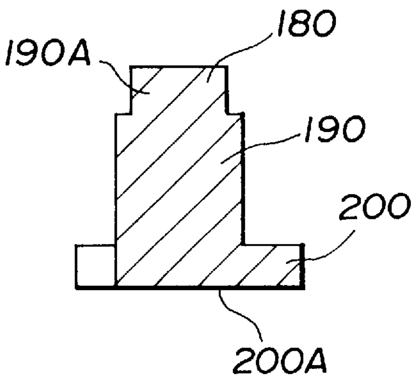
FIG. 14 is a longitudinal cross sectional view cut away along a line of XIV—XIV of FIG. 13.

FIGS. 13 and 14 integrally show a structure of a first bar-shaped core 180 used in the third embodiment.

Figure 15:
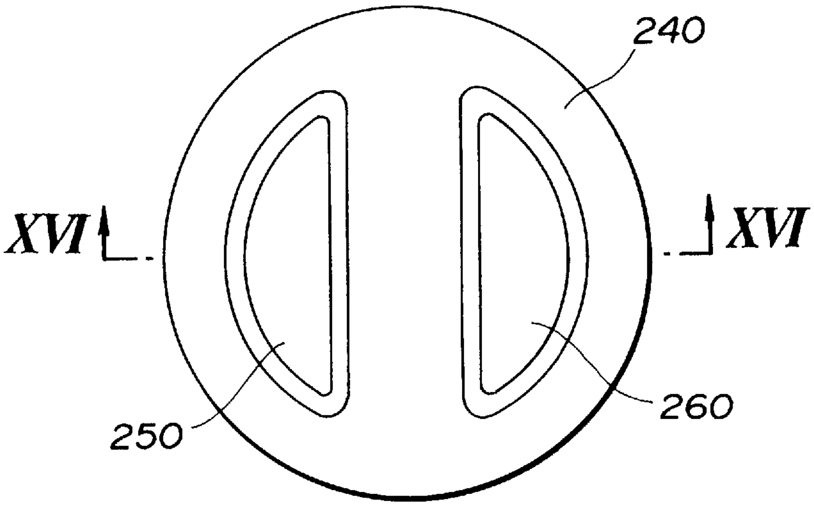
FIG. 15 is a schematic plan view of a plate-like member constituting the core member shown in FIG. 11.
Figure 16:
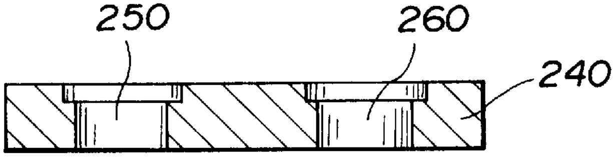
FIG. 16 is a longitudinal cross sectional view cut away along a line of XVI—XVI of FIG. 15.

FIGS. 15 and 16 integrally show a structure of a plate-like core 240 used in the third embodiment.

Figure 17:
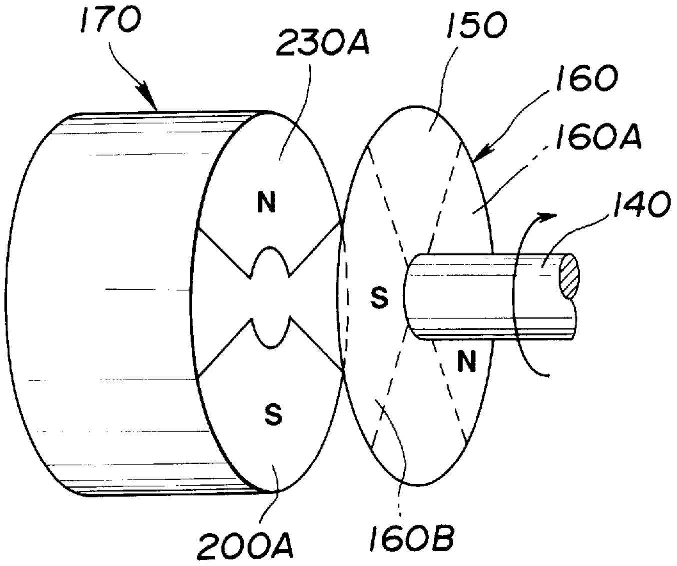
FIGS. 17 and 18 are explanatory views representing a pivotal movement of a rotary axle in clockwise and counterclockwise directions by means of the valve actuator arrangement in the third embodiment, respectively.

FIG. 17 shows a clockwise directional pivotal movement of the rotary valve axle 140 with respect to the core member 170 in the third embodiment.

Figure 18:
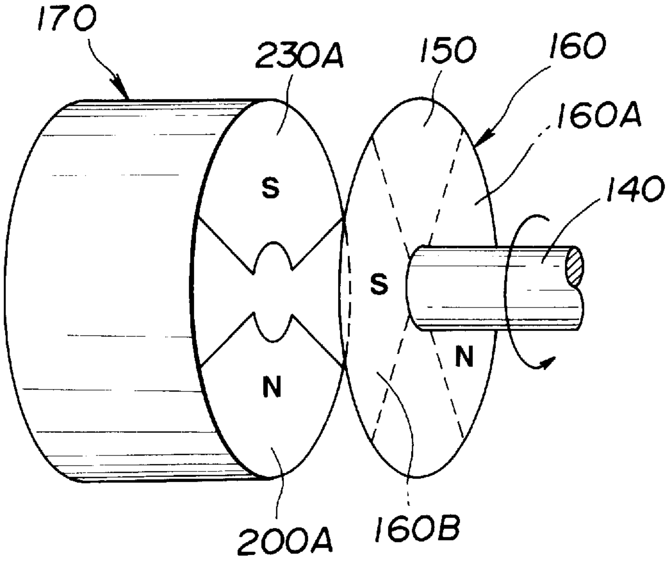

FIG. 18 shows a counterclockwise directional pivotal movement of the rotary valve axle 140 with respect to the core member 170 in the third embodiment.

In FIG. 8, a reference numeral 400 corresponds to the throttle sensor 21, the reference numeral 200 corresponds to the throttle chamber 1, the reference numeral 300 corresponds to the throttle valve body 3, the reference numeral 100 corresponds to the intake air passage 2, the reference numeral 700 corresponds to the throttle lever 11, the reference numerals 800 and 900 correspond to the two coil springs 12 and 13.

The rotary valve axle 140 (corresponds to the valve axle 4 in the first embodiment) is rotatably inserted into an axle inserting hole 130A of a rotary axle supporting plate 130 (as typically shown in FIG. 9). A magnet attaching plate 150 of a disc-shaped plate form is fixed onto one end of the rotary axle 140 and the throttle valve body 300 (3 in the first embodiment) is fixed onto the other end of the magnet attaching plate 150. One side of the rotary valve axle 140 is inserted into the casing 120 and the other side is projected from the casing 120 and is extended into the intake air passage 100.

The permanent magnet 160, as shown in FIG. 10, includes a pair of sector shaped N and S poles 160 (160A and 160B) fixed onto one surface of a disc-shaped magnet attaching plate 150 and the throttle valve body 300 is attached onto another surface of the disc-shaped magnet attaching plate 150. One (160A) of the pair of sector shaped poles 160 (160A and 160B) provides the N pole and the other 160B of the pair of sector shaped poles 160 provides S pole, both poles 160A and 160B being attached on one end surface of the magnet attaching plate (disc-shaped body) 150.

It is noted that a sector angle, i.e., an angle between one end line and the other end line of each sector-shaped pole 160A and 160B is denoted by $\theta_1$ (as shown in FIG. 10).

A core member 170 is of wholly an approximately cylindrical shape, the core member 170 opposing the permanent magnet (the pair of sector-shaped poles) 160 and being inserted into one end of the cylindrical casing 120 (as shown in FIG. 9).

The core member 170 includes: the first bar-shaped core 180 and the second bar-shaped core 210, both mutually faced against each other; a plate-like core 240 linking the first bar-shaped core 180 and second bar-shaped core 210. Each of the first bar-shaped core 180, the second bar-shaped core 210, and the plate-like core 240 is formed of a ferrite series stainless steel (as will be described later).

The first bar-shaped core 180 includes: a semi-cylindrical bar-shaped body 190 disposed so as to face against a second bar-shaped core 210 in an elongated direction, as shown in FIGS. 9, 11, and 12 through 14, a clockwise directionally rotating (normal or forward rotating) coil 270 (corresponds to the valve closing one 8*b* of the pair of windings 8 in the first embodiment) being wound on the semicircular cylindrical bar-shaped body 210 at one end and a sector-shaped body 200 (refer especially to FIG. 11) formed as a flange of the bar-shaped body 190.

In addition, a smaller-diameter, semi-cylindrical inserting portion 190A is formed on a tip end of the bar-shaped body 190, an end surface of the other end of the sector-shaped body 200 being formed as a magnet opposing surface 200A. It is noted that, as shown in FIG. 12, the sector angle of the magnet opposing surface 200A is $\theta_2$.

The second bar-shaped core 210 is formed in the same manner as the first bar-shaped core 180.

The second bar-shaped core 210 includes: a) a bar-shaped body 220 having a surface on which the reverse rotating coil 280 (which corresponds to the valve opening one of the pair of windings 8*a* is wound via a coil bobbin 300; and *b*) a sector-shaped body 230 (refer to FIG. 11) located at the other end of the bar-shaped magnet and formed as a flange portion of the bar-shaped body 220 which is opposed to the magnet 160 with the same plane as the sector body 200.

A smaller-diameter semicircular inserting portion 220A is formed on a tip end of the bar-shaped body 220. The other end surface of the sector body 230 is formed with the magnet opposing surface 230A. It is noted that the sector angle of the magnet opposing surface 230A is denoted by $\theta_2$ as shown in FIG. 12.

The plate-like core 240 is formed of a disc-shaped plate, as shown in FIGS. 11, 15, and 16, an inserting hole 250 into which a hole inserting portion 190A of the bar-shaped body 190 is inserted is formed at one end of a diameter position symmetrical to a center of the core 240 and an inserting hole 260 into which the inserting portion 220A of the bar-shaped body 220 is inserted is formed at the other end of the diameter position thereto. The plate-like core 240 constitutes the core member 170 with the first bar-shaped core 180, the second bar-shaped core 210, and the plate-like core 240 by combining (linking) one end of the first bar-shaped core 180 with the one end of the second bar-shaped core 210.

The forward rotating coil 270 is wound on the bar-shaped body 220 of the first bar-shaped core 190 via the coil bobbin 290. The reverse rotating coil 280 is wound on the bar-shaped body 220 of the second bar-shaped core 210 via the coil bobbin 300. The forward rotatable coil 270 acts as a valve closing coil (winding 8*b*) in the electronically controlled throttle valve apparatus as the valve actuator arrangement in the third embodiment.

The reverse rotating coil (winding 8*b*) 280 acts as the valve opening coil (winding 8*a*).

A relationship of the sector angle $\theta_1$ of each sector-shaped magnet 160A and 160B, the sector angle $\theta_2$ of the magnet opposing surface 200A of the first bar-shaped core 180, and the sector angle $\theta_2$ of the magnet opposing surface 200A of the first bar-shaped core 180, and the sector angle $\theta_2$ of the magnet opposing surface 230A of the second bar-shaped core 210 will be described below.

The angles $\theta_1$ and $\theta_2$ are set in the third embodiment as follows:

$$\alpha+\beta\leqq 180°-\{(\theta_2-\theta_1)+2(180°-\theta_2)\} \quad (1),$$

wherein $\alpha$ denotes an operational angle of the throttle valve body 300 and $\beta$ denotes an assembly variation (margin) angle.

Consequently, the set sector (margin) angles $\theta_1$ and $\theta_2$ permits a development of an optimum magnetic field achieving an accurate adjustment of the valve opening angle.

In the third embodiment, when $\alpha$=83° and $\beta$=28°, $\theta$1=120° and $\theta_2$=170°.

The rotary-type electromagnetic actuator 110 is operated as follows with reference to FIGS. 17 and 18.

First, only when a current flows through only the forward rotating coil (winding) 270, the N pole is magnetized on the magnet opposing surface 230A of the second bar-shaped core 210 of the core member 170 and the S pole is magnetized on the magnet opposing surface 200A of the second bar-shaped core 180, the magnetic field being developed from the magnet opposing surface 230A toward the magnet opposing surface 200A. On the other hand, the magnetic field is developed from the N pole sector-shaped magnet 160A toward the S pole sector-shaped magnet 160B in the case of a gap between the sector-shaped magnets 160A and 160B of the permanent magnet 160.

Hence, as shown in FIG. 17, when the sector-shaped magnet poles 160A and 160B of the magnet 160 are placed at intermediate positions against the opposing surfaces 200A and 230A of the core member 170, the magnetic field developed from the opposing surfaces 200A and 230A and that developed from the sector-shaped magnets 160A and 160B causes attraction and repelling to and from the magnet 160, thus the rotary valve axle 140 being pivoted in the clockwise direction denoted by an arrow of FIG. 17.

On the other hand, only when a current flows into the reverse rotating coil 280, the S pole is, in turn, magnetized on the magnet opposing surface 230A of the second bar-shaped core 210 and the N pole is, in turn, magnetized on the magnet opposing surface 200A, so that the magnetic field is developed from the opposing surface 200A toward the magnet opposing surface 230A.

Hence, as shown in FIG. 18, the magnetic field developed from the opposing surfaces 200A and 230A and that developed from the sector-shaped magnet poles 160A and 160B causes the attraction and repelling to and from the magnet to pivot the rotary valve axle 140 in the arrow-marked direction (counterclockwise direction) of FIG. 18.

As described above, since the rotary type electromagnetic valve actuator arrangement 110 in the third embodiment inputs pulse train signals having manually opposing levels to both of the forward and reverse (rotating) coils 270 and 280 (for example, a fixed frequency of 300 Hz).

Therefore, when the pulse train signal inputted to the forward rotating coil 270 is turned to ON, the pulse train signal received by the reverse rotating coil 280 is turned to OFF. When the pulse train signal inputted to the forward rotating coil 270 is turned to OFF, the pulse train signal received by the reverse rotating coil 280 is turned to ON.

Consequently, when the pulse train signal received by the forward rotating coil 270 is turned to ON, the magnetic field developed from the forward rotating coil 270 causes the rotary valve axle 140 to be pivoted in the clockwise direction. When the pulse train signal received by the forward rotating coil 270 is turned to OFF, the magnetic field developed from the reverse rotating coil 280 causes the rotary valve axle 140 to be pivoted in the counterclockwise direction.

However, in an actual practice, the pivotal movement of the rotary axle 140 cannot follow the ON and OFF of the pulse train signal, consequently the rotary valve axle 140 is pivoted and held at a pivoted angular position corresponding to either one of the pulse train signals (one of the pulse train signals has the same duty ratio as the other pulse train signal).

That is to say, when the duty ratio of each pulse train signal is 50%, the pivotal movement of the rotary valve axle 140 in FIG. 17 is canceled against the pivotal movement of the rotary axle 140 in FIG. 18.

In the case of 50% duty ratio (on duty is equal to off duty), the rotary valve axle 140 is held at the neutral position of each of FIGS. 17 and 18.

On the other hand, if the duty ratio of the corresponding one of the pulse train signal to the forward rotating coil 270 is longer than 50% (on duty is increased), the rotary valve axle 140 is held at a predetermined position, the valve axle 140 being pivoted in the arrow-marked clockwise direction at a predetermined position corresponding to the increased on duty.

In addition, when receiving the elongated on duty of the other pulse train signal to the reverse rotating coil 280, the rotary valve axle 140 is pivoted in the arrow-marked counterclockwise direction at a predetermined position corresponding to the on duty in the other pulse train signal to the reverse rotating coil 280 as shown in FIG. 18. It is noted that the transistors 60A and 60B receives the pulse train signals at their bases from the TCM 50.

Next, advantages of the assembled parts of the rotary-type electromagnetic actuator 110 as the valve actuator arrangement in the third embodiment will be described below.

In the rotary-type electromagnetic actuator 110 constituting the valve actuator arrangement in the third embodiment, the core member 170 opposes against the magnet 160 on the axial line of the rotary axle 140. It is not necessary to install the core member 170 on the outer periphery of the permanent magnet 160. Consequently, a diameter directional dimension of the rotary-type electromagnetic actuator 110 can be small sized so that a miniaturization (small sizing) of the whole electromagnetic actuator 110 can be achieved.

In addition, the core member 170 is formed by a single magnetic path constituted by three members of the first bar-shaped core 180, the second bar-shaped core 210, and the plate-like core 240.

The forward rotating coil 270 is wound on the bar-shaped body 190 of the first bar-shaped core 180 and the reverse rotating oil 280 is wound on the bar-shaped body 220 of the second bar-shaped core 210.

Mutually different magnetic poles are developed on sector-shaped magnet opposing surfaces 200A and 230A when drive currents flow into both forward and reverse rotating coils 270 and 280 (actually, the mutually level opposed pulse train signals) via the transistor circuit 60.

The sector-shaped magnet opposing surfaces 200A and 230A are combined to form the same plane.

Since the bar-shaped body 190 on which the forward rotating coil 270 is wound and the bar-shaped body 220 on which the reverse rotating coil 280 is wound are respectively of semicylindrical shapes. Hence, the bar-shaped bodies 190 and 220 are cylindrical via a space. The coils 270 and 280 wound respectively on the bar-shaped bodies 190 and 220 in the space. The space within the core member 170 can effectively be utilized and the coils 270 and 280 can be wound in the space.

Furthermore, since both coils 270 and 280 can be housed within a circumscribed circle formed by the sector-shaped bodies 200 and 230, an axial size and diameter size can be small sized. Consequently, the miniaturization of the rotary-type electromagnetic actuator 110 can be achieved.

In addition, the magnet 160 is constituted by a pair of sector-shaped magnets 160A and 160B. The magnetic field is always developed from the one sector-shaped magnet 160A having the N pole surface toward the other sector-shaped magnet 160B having the S pole surface. The magnetic field is developed corresponding to each pulse train signal duty ratio received by the forward rotating coil 270 and reverse rotating coil 280. Hence, the rotary axle 140 can be pivoted by the magnetic attraction and repelling between the magnetic field developed on the magnetic opposing surfaces 200A and 230A of the core member 170 and that developed between the sector-shaped magnets 160A and 160B.

The magnetic field is, as described above, developed corresponding to the pulse train signal duty ratio received by the forward rotating coil 270 and reverse rotating coil 280. Hence, the rotary axle 140 can be pivoted by the magnetic attraction and repelling between the magnetic field developed on the magnet opposing surfaces 200A and 230A of the core member 170 and that developed between the sector-shaped magnets 160A and 160B.

At this time, since the sector-shaped magnets 160A and 160B and sector-shaped magnets 200 and 230 are formed in the sector shape, the magnetic field developed from the magnet 160 can always assure the magnetic attraction and repelling against either of the sector-body shaped magnets 200 and 230 (between the magnet opposing surfaces 200A and 230A).

Furthermore, since each of the first bar-shaped core 180, second bar-shaped core 210, and the plate-like core 240 is formed by, so-called, an electromagnetic stainless steel, e.g., a ferrite series stainless steel(Mn—Zn ferrite), an eddy current developed within the core member 170 is reduced and a drive current (each pulse train signal) can be minimized. A responsive characteristic of the rotary axle 140 can, thus, be increased. The ferrite series stainless steel can undergo a cold forging. The manufacturing cost can be reduced. It is noted that, in the third embodiment, the core member 170 is formed of the ferrite series stainless steel. However, a Silicon steel or soft iron may be formed. Furthermore, a powder of a material (for example, pure iron) having an electrical characteristic equal to the Silicon Steel or Soft iron may be used for the core member 170 as a sintered alloy.

Fourth Embodiment

It is noted that the explanation of the operation in the valve actuator arrangement in the third embodiment with reference to FIG. 8 is applicable to that in the valve actuator arrangement in a fourth embodiment.

FIG. 19 through 36 show the valve actuator arrangement (the rotary-type electromagnetic actuator) in the fourth embodiment.

Figure 19:
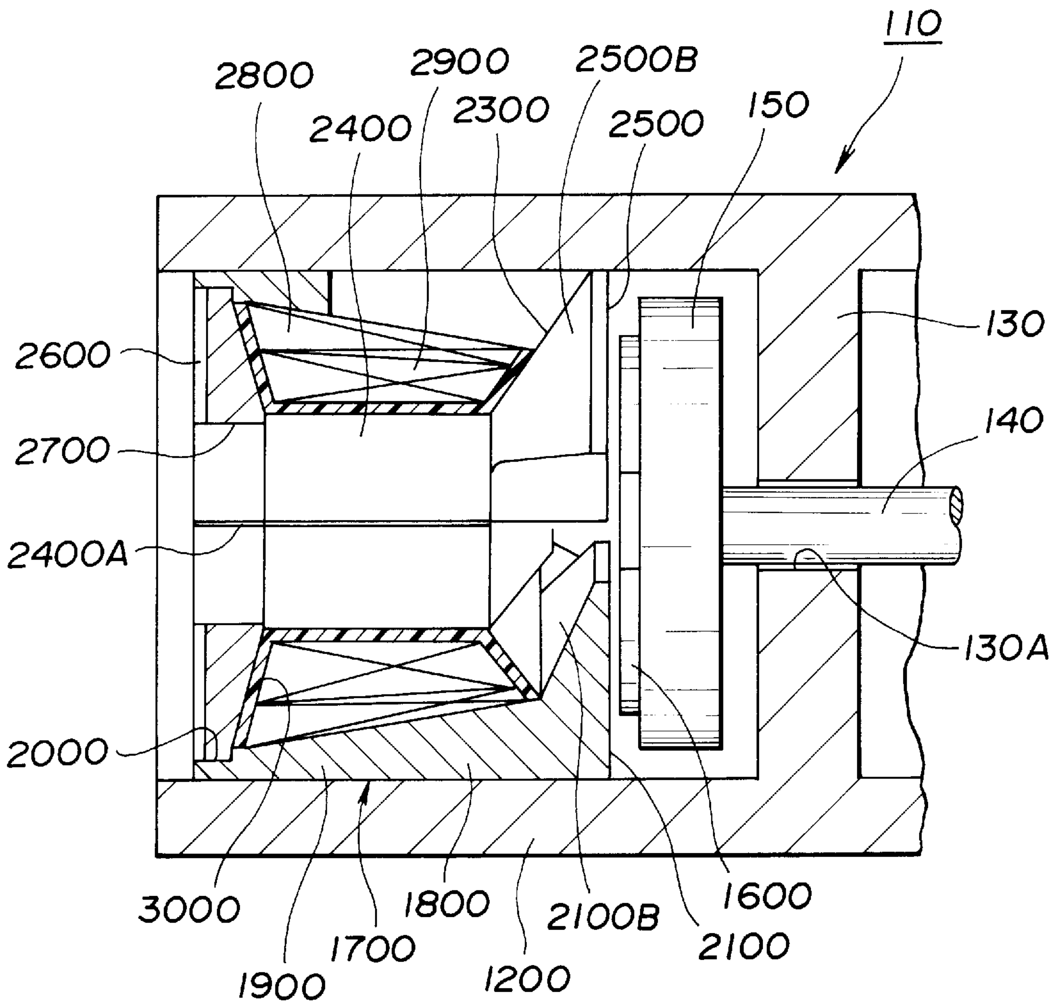
FIG. 19 is a longitudinal cross sectional view of the valve actuator arrangement (the rotary-type electromagnetic actuator) in a fourth preferred embodiment according to the present invention.

In FIG. 19, numeral 110 denotes the rotary type electromagnetic actuator in the fourth embodiment. It is noted that although the same reference numeral as 110 is used in the third and fourth embodiments, the structure of each of the rotary type electromagnetic actuators 110 is different. Typically in FIG. 19, 1200 denotes a cylindrical casing serving as an outer appearance of the rotary-type electromagnetic actuator 110, 130 denotes a rotary axle supporting plate portion continued with the cylindrical casing 1200.

The rotary axle 140 operatively serves to pivot the (throttle) valve body 300 (for the throttle valve body 300, also refer to FIG. 8).

The rotary axle 140 is inserted into the axle inserting hole 130A of the rotary axle supporting plate portion 130. One end of the rotary axle 140 is fixed to the disc-shaped magnet attaching plate 150. The throttle valve body 300 is fixed to the other end thereof 140. The one end side of the rotary valve axle 140 is inserted into the casing 1200. The other end side thereof 140 is projected from the casing 1200 in the intake air passage 100 (also refer to FIG. 8).

Figure 20:
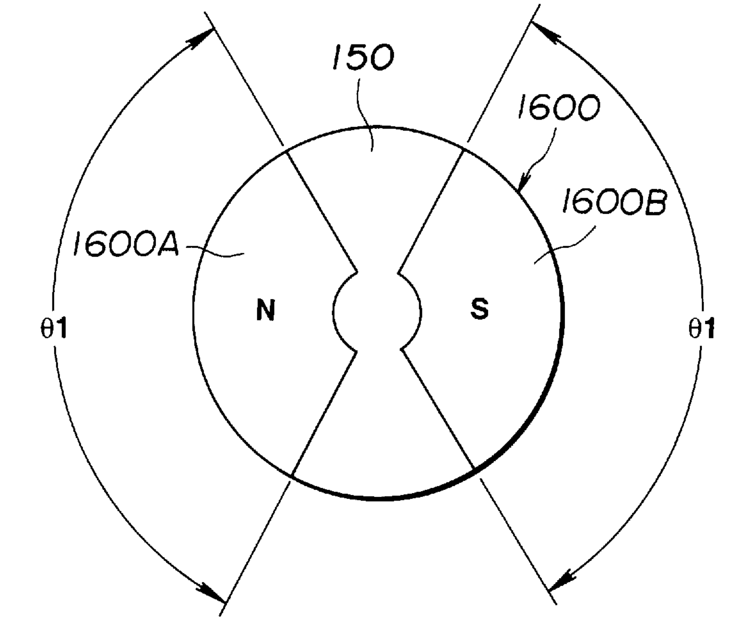
FIG. 20 is a schematic front view of the permanent magnet used in the fourth embodiment shown in FIG. 19.
Figure 21:
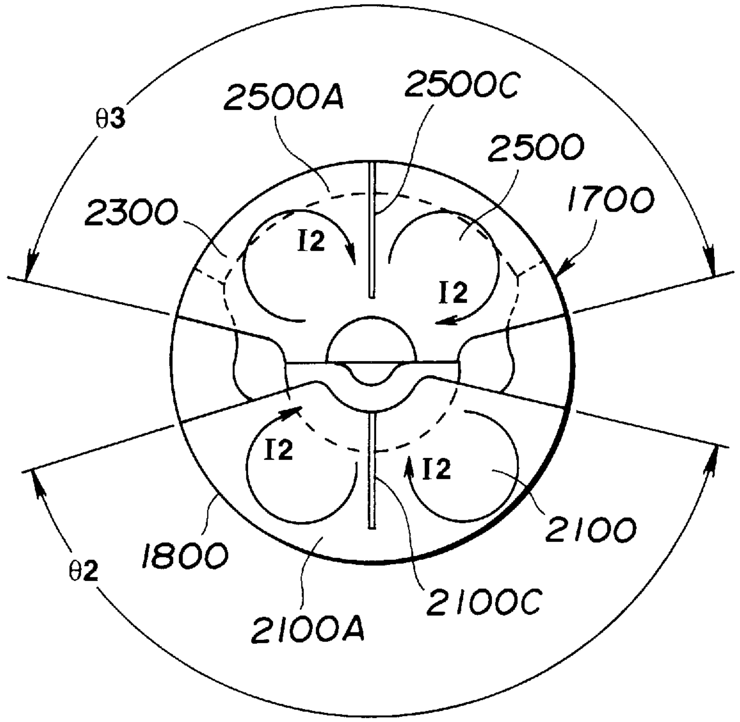
FIG. 21 is a schematic front view of a pair of sector-shaped lid portions constituting the core member used in the valve actuator arrangement in the fourth embodiment shown in FIG. 19.

The pair of sector-shaped permanent magnet poles 1600A and 1600B are attached onto the disc-shaped magnet attaching plate 150 fixed on the one end of the rotary axle 140, as shown in FIG. 20. The one sector-shaped magnet pole 1600A has a surface of N pole. The other sector-shaped magnet pole 1600B has a surface of S pole. Each sector angle of both magnets is $\theta_1$ as shown in FIG. 20.

Referring back to FIG. 19, the core member 1700 is wholly formed in the cylindrical shape.

The core member 1700 is opposed against the pair of the sector-shaped permanent magnet 1600 (N pole 1600A and the S pole 1600B) and is inserted into one end of the casing 1200 so as to be located on the axial line of the rotary valve axle 140.

Figure 22:
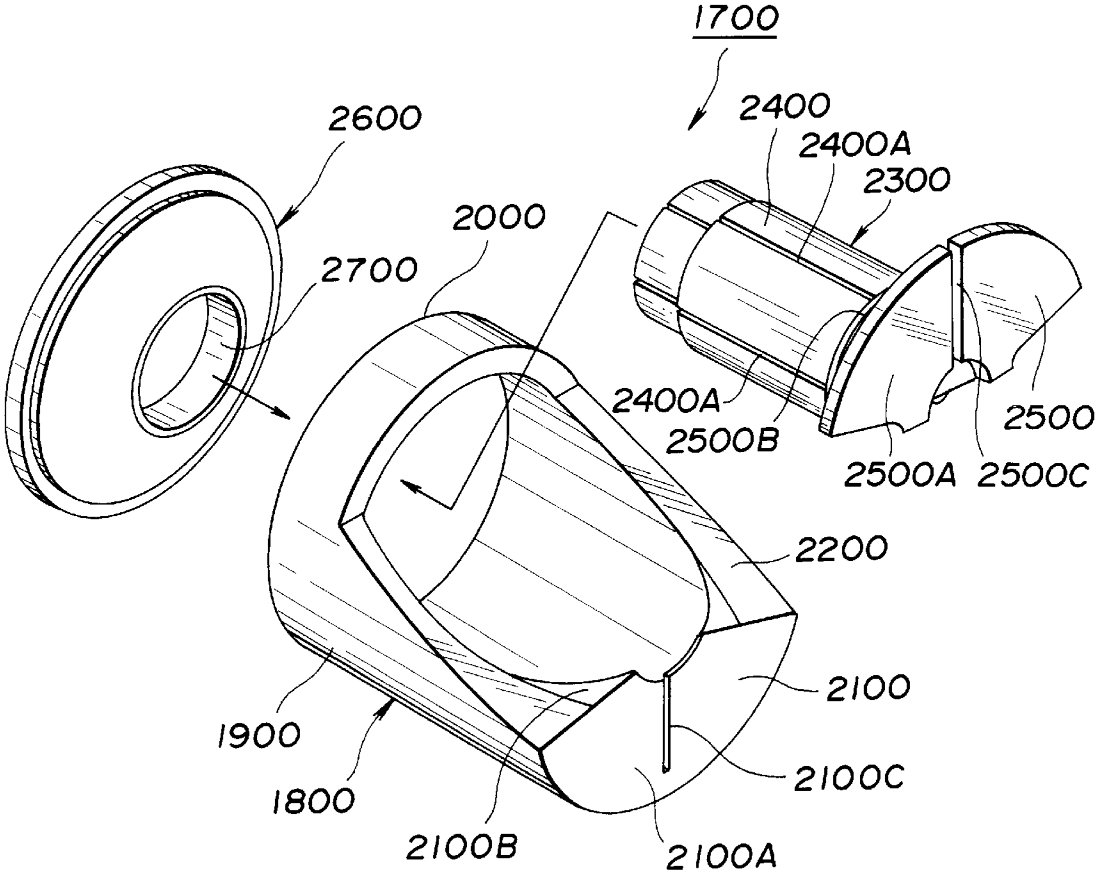
FIG. 22 is a perspectively projected and exploded view of the core member used in the valve actuator arrangement in the fourth embodiment shown in FIG. 19.

The core member 1700 (as shown in FIG. 22) is constituted by a cylindrical core 1800, a bar-shaped core 2300, and a plate-like core 2600, each being made of the ferrite series stainless steel as described in the case of the third embodiment.

The cylindrical core 1800 constitutes an outer shape of the core member 1700.

The cylindrical core 1800 includes: a cylindrical body 1900 having a thickness being gradually thicker from one end toward the other end, as shown in FIGS. 21 through 24; an opening 2000 formed on one end of the cylindrical body 1900; a sector-shaped lid portion 2100 (refer to FIG. 22) located at the other end of the cylindrical body 1900 and formed in a sector shape so as to be opposed against the other end of the cylindrical body 1900; and an inclined opening 2200 (refer to FIG. 24) formed by cutting a part of the cylindrical body 1900 in a direction from the sector-shaped lid portion 2100 toward the opening 2000.

The sector-shaped lid portion 2100 includes: the sector-shaped magnet opposing surface 2100A; a tapered surface 2100B to link between the magnet opposing surface 2100A and the cylindrical body 1900; and a slit 2100C penetrating from the inside in the radial direction toward the outside therein so as to slit the magnet opposing surface 2100A into approximately two. It is noted that the sector angle of the sector-shaped lid portion 2100 is $\theta_2$.

The thickness size of the cylindrical body 1900 is formed such that a gradual thickness is increased from the opening 2000 toward the sector-shaped lid portion 2100.

Figure 23:
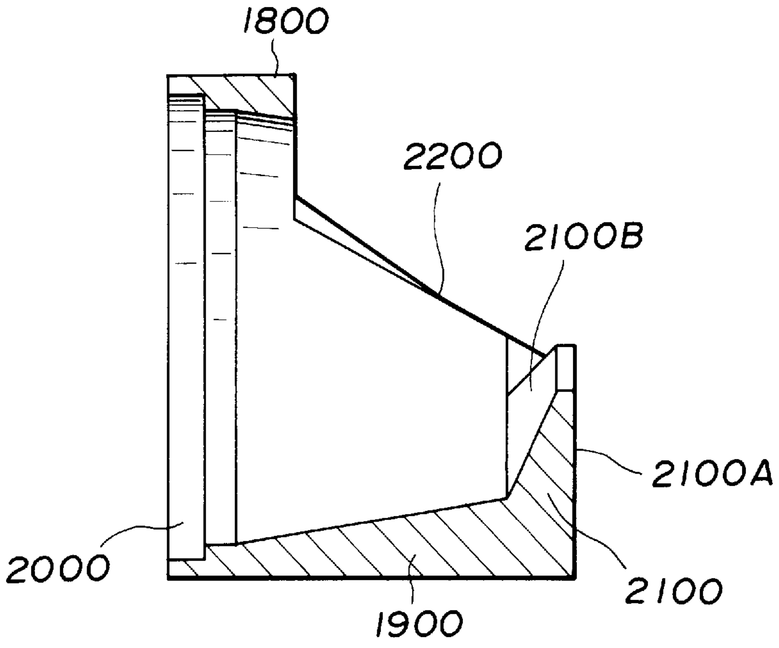
FIG. 23 is a longitudinal cross sectional view of a cylinder-shaped core used in the fourth embodiment shown in FIG. 19.
Figure 24:
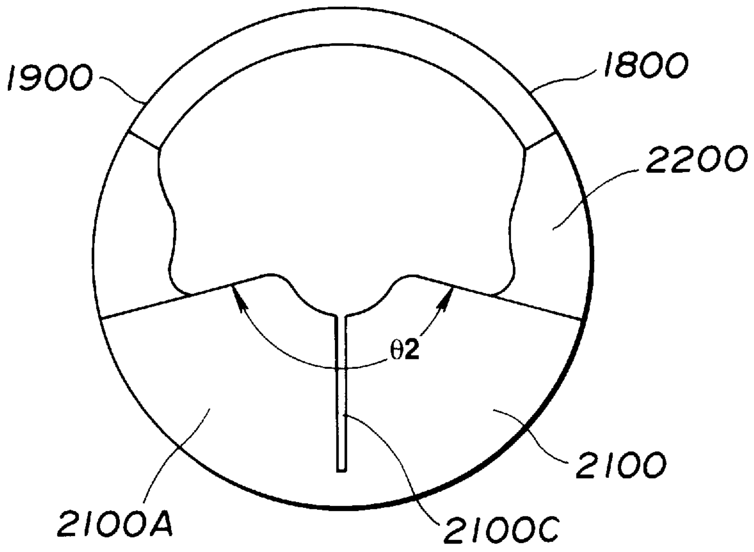
FIG. 24 is a schematic front view of the cylinder-shaped core shown in FIG. 21.
Figure 25:
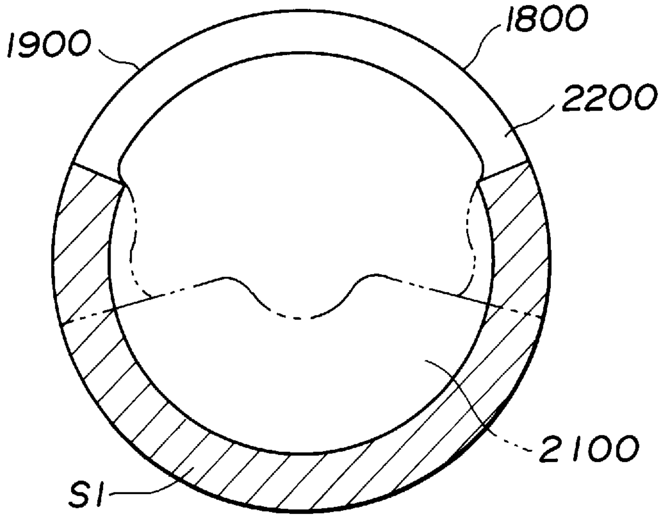
FIGS. 25 and 26 are explanatory views each for explaining a virtual cross section of the cylinder-shaped core at an arbitrary axial position.
Figure 26:
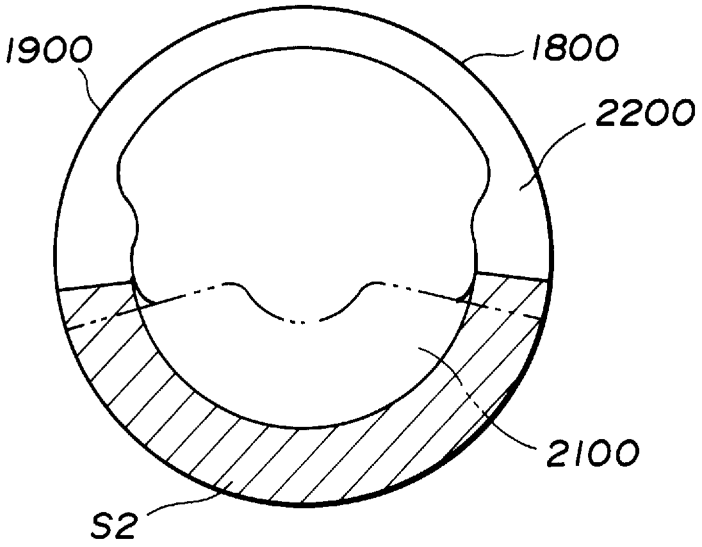
Figure 27:
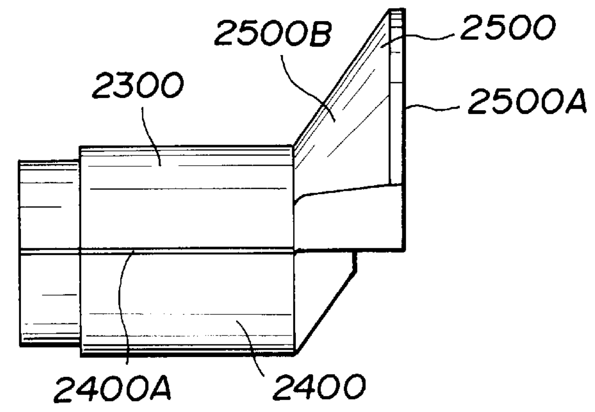
FIG. 27 is a schematic side view of a bar-shaped core used in the fourth embodiment shown in FIG. 10.
Figure 28:
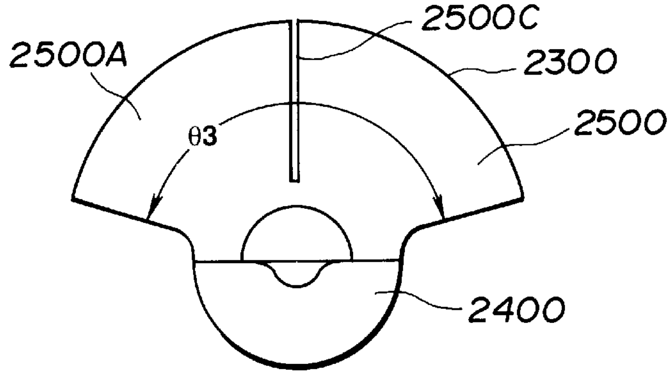
FIG. 28 is a schematic front view of the bar-shaped core shown in FIG. 27.
Figure 29:
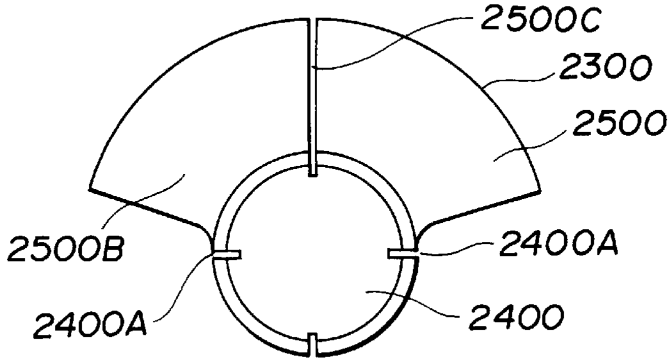
FIG. 29 is a schematic rear view of the bar-shaped core shown in FIGS. 27 and 28.

An area S1 of a virtual cross section on the opening 2000 shown in FIG. 23 is approximately constant at any axial position. An area S2 of a virtual cross section on the sector-shaped lid portion 2100 shown in FIG. 24 is approximately constant at any axial position.

(Furthermore, the sector-shaped lid portion 2100 is formed with the slit 2100C (refer to FIG. 24) penetrating from an inner diameter direction toward an outer diameter direction so as to slit its sector shape into approximately two.)

It is noted that the sector angle of the magnet opposing surface 2100A is $\theta_2$.

The bar-shaped core 2300 is housed within the cylindrical core 1800, as shown in FIGS. 21, 27, 28, and 29. The bar-shaped core 2300 includes: the bar-shaped portion 2400 on which, first, the forward rotating coil 2800 and, thereafter, the reverse rotating coil 2900 are wound; and the sector-shaped lid portion 2500 (refer to FIG. 27) located at the other side of the bar-shaped portion and formed in a sector shape so as to oppose against the magnet 1600. The sector-shaped lid portion 2500 is combined with the sector-shaped lid portion 2100 to form the same plane.

The sector-shaped lid portion 2500 includes: the sector-shaped magnet opposing surface 2500A; the tapered surface 2500B linking between the sector-shaped lid portion 2500A and the bar-shaped portion 2400; and the slit 2500C penetrating from the outside in the radial direction toward the inside in the radial direction so as to slit the sector shape into approximately two.

It is noted that the sector angle of the magnet opposing surface 2500A is $\theta_3$.

Four slits 2400A are formed axially at each interval of 90 degrees on an outer peripheral surface of the bar-shaped portion 2400.

Figure 30:
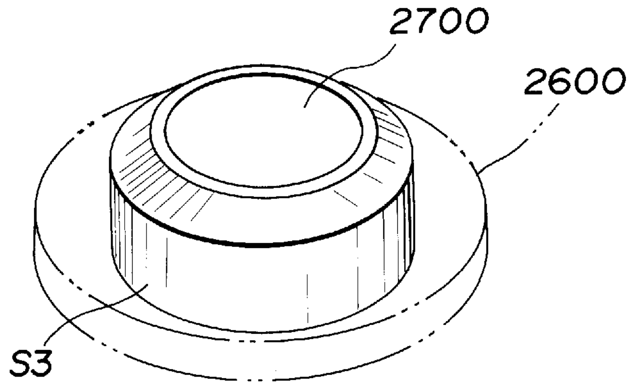
FIGS. 30 and 31 are explanatory views, each representing a virtual outer periphery of a plate-like core used in the fourth embodiment shown in FIG. 19.
Figure 31:
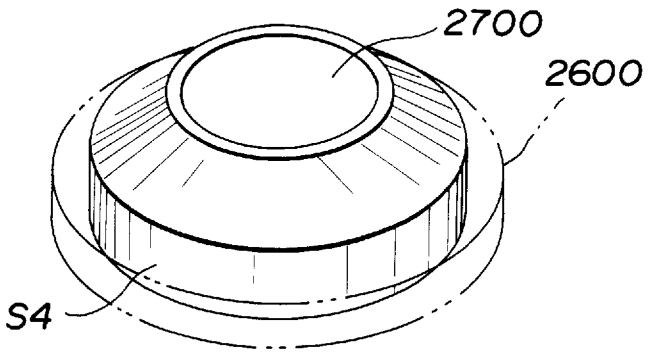

As shown in FIG. 22, the plate-like core 2600 is formed of a generally flat conical shape and, as shown in FIGS. 30 and 31, is provided with an axial portion inserting hole 2700 at a center portion thereof into which the bar-shaped portion 2400 of the bar-shaped core 2300 is inserted. In addition, one end of the bar-shaped portion 2400 of the bar-shaped core 2300 is inserted into the axial portion inserting hole 2700.

In addition, the outer periphery of the plate-like core 2600 is inserted into the opening 2000 of the cylindrical core 1800 so that a circular space between the opening 2000 and the bar-shaped portion 2400 is closed.

Furthermore, since the plate-like core 2600 is formed in the conical shape, the height size toward the radial direction of the plate-like core 2600 becomes gradually short (small) and the length size in the peripheral direction thereof becomes gradually long.

Hence, a surface area S3 of a virtual outer periphery having a smaller diameter shown in FIG. 30 is approximately constant in the peripheral direction along the hole 2700. In addition, a surface area S4 of a virtual outer periphery having a larger diameter shown in FIG. 31 is approximately constant in the peripheral direction along the hole 2700.

In addition, each sector angle $\theta_1$ of the sector-shaped magnet poles 1600A and 1600B, the sector angle $\theta_2$ of the magnet opposing surface 2100A of the cylindrically shaped core 1800, and the sector angle $\theta_3$ of the magnet opposing surface 2500A of the bar-shaped core 2300 have the following relationship.

$$\alpha+\beta\leqq 180°-\{(\theta_3-\theta_1)+2(180°-\theta_2)\} \quad (2),$$

wherein $\alpha$ denotes the operational angle of the throttle valve body 300 and $\beta$ denotes the assembly variation angle.

Specifically, in the fourth embodiment, when $\alpha=83°$ and $\beta=27°$, $\theta_1=120°$, $\theta_2=\theta_3=170°$.

It is noted that as shown in FIG. 19, the forward rotating coil 2800 and the reverse rotating coil 2900 are wound on the bar-shaped portion 2400 of the bar-shaped core 2300 via a coil bobbin 3000. The wound forward rotating coil 2800 is inner and the wound reverse rotating coil 2900 is outer. The wound forward rotating coil 2800 acts to close the throttle valve (300 in the same way as described in the third embodiment) and the wound reverse rotating coil 2900 acts to open the throttle valve (300), in the same way as described in the third embodiment.

Figure 32:
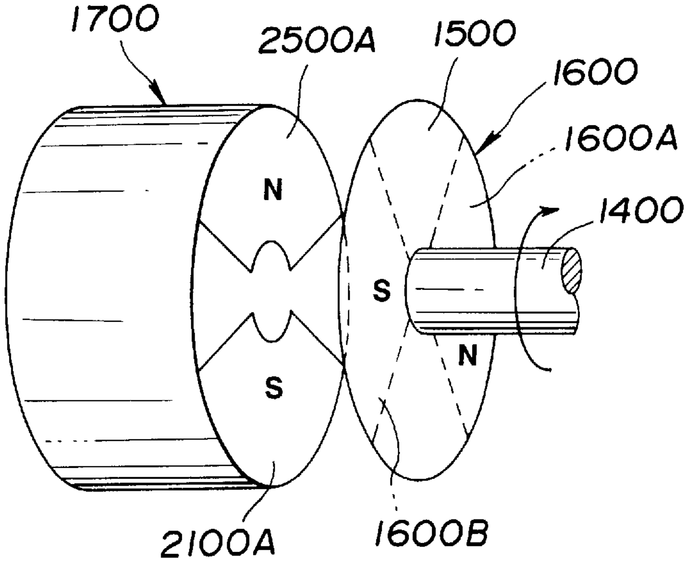
FIGS. 32 and 33 are explanatory views for explaining the pivotal movements of the rotary axle toward the clockwise and counterclockwise directions by means of the valve actuator arrangement in the fourth embodiment shown in FIG. 19, respectively.
Figure 33:
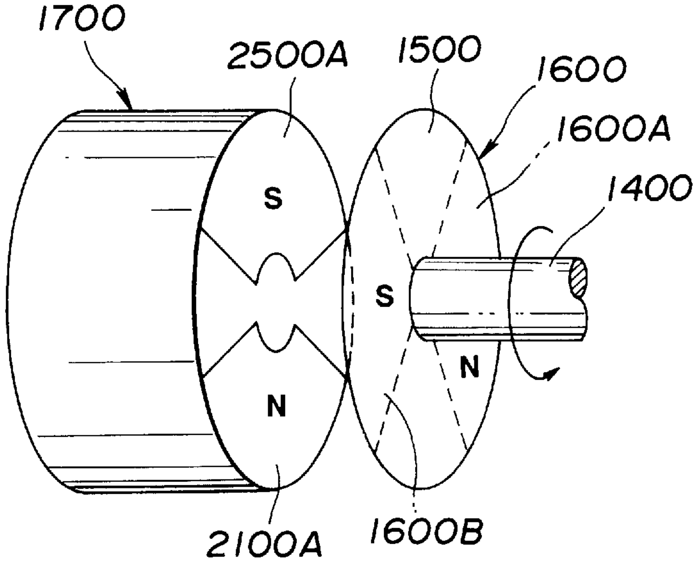
Figure 34:
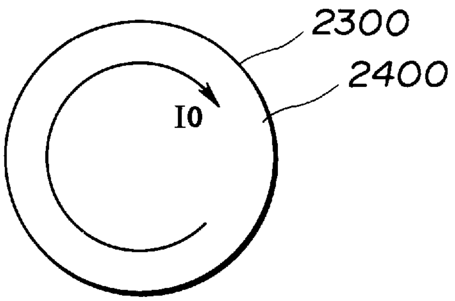
FIG. 34 is an explanatory view for explaining an eddy current developed on a bar-shaped portion, on an outer peripheral edge of which no slit is formed.

Next, the operation of the rotary-type electromagnetic actuator 110 as the valve actuator arrangement in the fourth embodiment with reference to FIGS. 32 and 33 is generally the same as the operation of that in the third embodiment with reference to FIGS. 17 and 18 although the reference numerals designating the corresponding elements are different from each other. Hence, the detailed explanation of operation of the electromagnetic actuator 110 will be omitted herein. It is noted that the reference numeral 1400 denotes the valve axle.

In the fourth embodiment, the core member 1700 forms the magnetic path constituted by the three members of the cylindrical core 1800, the bar-shaped core 2300, and the plate-like core 2600. Both of the forward (normally) rotating coil 2800 and the reverse rotating coil 2900 are respectively wound on the bar-shaped portion 2400 of the bar-shaped core 2300. Hence, when currents (the pulse train signals (e.g., 300 Hz in frequency and as shown in FIGS. 3B and 3C)) flow through the coils 2800 and 2900, respectively, the mutually different magnetic poles are developed on the magnetic opposing surfaces 2100A and magnet opposing surfaces 2500A. The magnetic field can be developed in the space between the magnet opposing surfaces 2100A and 2500A.

In addition, since the cylindrical core 1800 and the bar-shaped core 2300, both of which provide the mutually different magnetic poles, are spaced from each other by means of the inclined opening 2200 of the cylindrical core 1800, a magnetic interference between the cylindrical core 1800 and the bar-shaped core 2300 can be eliminated. Consequently, a magnetic leakage can be reduced.

Then, since the inclined opening 2200 is formed in the cylindrical body 1900, the cylindrical body 1900 is formed such that the wall thickness thereof becomes thicker as the cylindrical body 1900 is advanced from the portion on which the opening 2000 is formed toward the sector-shaped lid portion 2100, the tapered surface 2500B is formed on the bar-shaped core 2300 between the bar-shaped portion 2400 and the sector-shaped lid portion 2500, and the plate-like core 2600 is formed in the conical shape (refer to FIG. 19), the magnetic flux flowing into the core member 1700 can pass a constant magnetic path cross sectional area (minimum magnetic cross sectional area). An external magnetic leakage from the core member 1700 can be reduced.

Since each of the cylindrical core 1800, the bar-shaped core 2300, and the plate-like core 2600 is formed by the ferrite series stainless steel in the same way as the third embodiment, the eddy current can be suppressed and the drive current can be reduced. The responsive characteristic of the valve axle (140 or 1400) can be increased. Cold forging is possible in the case of the ferrite series stainless steel and the manufacturing cost thereof can be reduced. The alternative material (Silicon Steel, soft iron, the powder of the pure iron) of the core member 170 in the third embodiment is applicable to the core member 1700 in the fourth embodiment.

The direction of the magnetic flux within the core member 1700 is alternatingly developed by the forward (normal) rotating coil 2800 and the reverse rotating coil 2900. If the slits 2400A were not present, the eddy current I0 shown in FIG. 34 would be developed.

Figure 35:
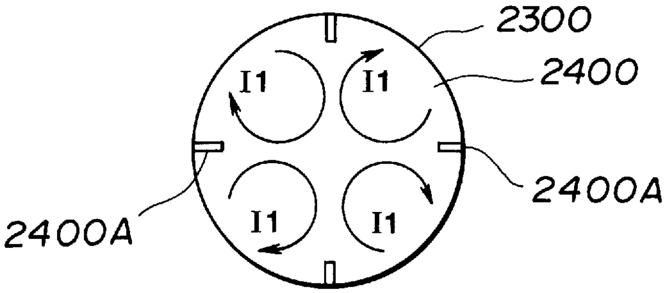
FIG. 35 is an explanatory view for explaining the eddy currents on the bar-shaped portion on the outer peripheral edge of which a plurality of slits are formed.

However, since, in the fourth embodiment, four slits 2400A are formed on the outer peripheral surface of the bar-shaped portion 2400 of the bar-shaped core 2300 in the fourth embodiment as shown in FIG. 35, four eddy currents I1 are developed on the outer peripheral surface whose directions are mutually opposed to adjacently developed eddy currents so that the magnetic leakage can be reduced. Since the eddy currents are suppressed, the responsive characteristic of switching the magnetic flux direction can be increased.

Figure 36:
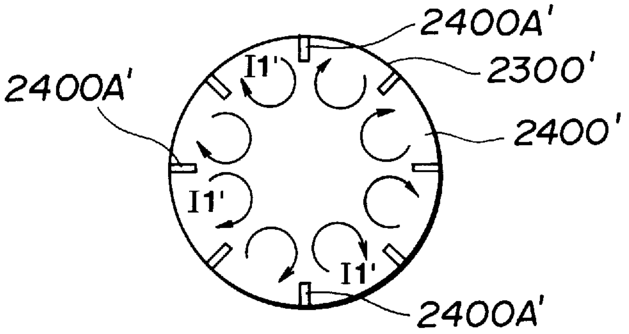
FIG. 36 is an explanatory view for explaining the eddy currents developed on bar-shaped portion, on the outer peripheral edge of which eight slits are formed as a modification of the fourth embodiment of the valve actuator arrangement shown in FIG. 19.

FIG. 36 shows an alternative of the bar-shaped core 2300.

As shown in FIG. 36, eight slits 2400A' are formed at each angular interval of 45 degress on the outer peripheral surface of the bar-shaped portion 2400' of the bar-shaped core 2300'. Eight eddy currents I1' are developed between the respective eight slits 2400A' whose directions are mutually opposed to adjacent ones. Thus, the magnetic leakage can be reduced and the eddy currents can be suppressed.

Since the core member 1700, in the fourth embodiment, is constituted by three members of the cylindrically shaped core 1800, the bar-shaped core 2300, and the plate-like core 2600, the leakage in the magnetic flux streaming into the core member 1700 can be reduced. The different magnetic fields between the sector-shaped lid portions 2100 and 2500 can effectively be developed. Thus, the responsive characteristic of the pivotal movement of the rotary axle (140 or 1400) can be increased.

Furthermore, as shown in FIG. 20, since the slit 2100C is formed on the sector-shaped lid portion 2100 of the core member 1700 to slit the sector-shaped lid portion into approximately two and the slit 2500C is formed on the sector-shaped lid portion 2500 of the core member 1700 to slit it into approximately two, two eddy currents I2 are developed on the surfaces of the sector-shaped lid portions 2100 and 2500 in the same way as the slit 2400A formed on the bar-shaped portion 2400.

The magnetic leakage can be reduced and the eddy currents can be suppressed.

The rotary-type electromagnetic actuator 110 as the valve actuator arrangement in the fourth embodiment is used in the electronically controlled throttle valve. The core member 1700 is disposed and located on the axial line of the rotary valve axle 140 (or 1400), so that the rotary-type electromagnetic actuator 110 can be small sized. A layout when the electronically controlled throttle valve is disposed within an engine compartment of a vehicle can be facilitated. The maintenance of the electronically controlled throttle valve can be increased.

Although the valve actuator arrangement in each of the first to fourth embodiment is applicable to the electronically controlled throttle valve in the intake air passage, the valve actuator arrangement can be applied equally well to an idling speed control valve and so forth in the engine.

What is claimed is:

1. A valve actuator arrangement for an internal combustion engine, comprising:

a valve structure having a valve body and a rotary valve axle;

an electric motor structure having a generally disc shaped body fixed on one end of said valve axle so as to be integrally pivoted with said valve axle;

a permanent magnet fixed on said disc-shaped body;

a fixing member fixed on the one end of said valve axle; and a pair of windings to form a pair of coils whose winding directions are mutually opposite to each other and wound around said fixing member so that a direction of a magnetic flux developed between each of said pair of windings and said permanent magnet is parallel to said valve axle.

2. A valve actuator arrangement for an internal combustion engine as claimed in claim 1, wherein when either of said pair of windings receives a current with no current received by the other of said pair of windings, the valve body is pivoted toward a valve full open direction and when the other of the pair of windings receives the current with no current received by the one of the pair of windings, the valve body is pivoted toward a valve full close direction.

3. A valve actuator arrangement for an internal combustion engine as claimed in claim 2, which further comprises a pair of spring members each being attached onto the other end of said valve axle so as to bias said valve body to be pivoted toward either of the valve full open or close direction and wherein biasing forces exerted by said pair of spring members being balanced so that the valve body is settled at a neutral position between the full open and close directions.

4. A valve actuator arrangement for an internal combustion engine as claimed in claim 3, wherein said valve structure is a butterfly valve throttling an intake air passage of the engine and which further comprises a limp home lever interlocked with an accelerator element via an accelerator wire and a throttle lever attached onto the other end of said valve axle of said butterfly valve so as to be engageable with the limp home lever.

5. A valve actuator arrangement for an internal combustion engine as claimed in claim 4, wherein said permanent magnet includes an N pole and an S pole each having an arc and semicircular shape with gaps provided on the disc-shaped body between the N pole and S pole.

6. A valve actuator arrangement for an internal combustion engine as claimed in claim 5, wherein each of said pair of windings includes a core member extended on surface of said fixing member so as to correspond to said permanent magnet and around of which a corresponding one of said pair of windings is wound.

7. A valve actuator arrangement for an internal combustion engine as claimed in claim 5, wherein each of said pair of windings includes a pair of core members extended on a surface of said fixing member with either one of said core members symmetrically arranged with the other one of said core members, around of each of which a corresponding one of the either of the pair of the windings is wound.

8. A valve actuator arrangement for an internal combustion engine as claimed in claim 4, wherein said permanent magnet includes an N pole and S pole on each surface of the disc-shaped body, each of the N poles and S poles having a semicircular shape with said valve axle as a center on one surface of said disc-shaped body.

9. A valve actuator arrangement for an internal combustion engine as claimed in claim 8, wherein each of said pair of windings includes four core members extended on both surfaces of said fixing member so as to correspond to said permanent magnets on the respective surface of said disc-shaped body, around of each of said core members, a corresponding one of each of the pair of windings being wound.

10. A valve actuator arrangement for an internal combustion engine as claimed in claim 1, wherein said pair of windings comprise a forward rotating coil which serves to close the valve body and a reverse rotating coil which serves to open the valve body, said fixing member is a magnetic core member opposed against said magnet and wherein said core member comprises: a first bar-shaped core having a bar-shaped body, formed at one side of the first bar-shaped core, on which said forward rotating coil is wound and having a sector-shaped body, formed at the other side of the bar-shaped core, on which said reverse rotating coil is wound; a second bar-shaped core, disposed so as to face against the first bar-shaped core, having a bar-shaped body, formed at the one side of the second bar-shaped core, on which said reverse rotating coil is wound and having a sector-shaped body, formed at the other side of the second bar-shaped core and which opposes against the magnet with the sector-shaped body of said first bar-shaped core combined; and a plate-like core having a disc-shaped body disposed so as to link the bar-shaped bodies of each of the first and second bar-shaped cores.

11. A valve actuator arrangement for an internal combustion engine as claimed in claim 10, wherein said permanent magnet comprises a pair of sector-shaped magnet poles, magnetized directions thereof being mutually different.

12. A valve actuator arrangement for an internal combustion engine as claimed in claim 11, wherein each of the bar-shaped bodies of the first and second bar-shaped cores is formed in a semicylindrical shape.

13. A valve actuator arrangement for an internal combustion engine as claimed in claim 12, wherein each of said first bar-shaped core, said second bar-shaped core, and said plate-like core is formed of a ferrite series stainless steel.

14. A valve actuator arrangement for an internal combustion engine as claimed in claim 1, wherein said pair of windings comprise a forward rotating coil which serves to close the valve body and a reverse rotating coil which serves to open the valve body, said fixing member is a magnetic core member opposed against said magnet and wherein said core member comprises: a cylindrical core in a cylindrical form having one end providing an opening and having the other end providing a sector-shaped lid portion opposed against said magnet; a bar-shaped core, disposed within said cylindrical core, having one end forming a bar-shaped portion on which both of said forward and reverse rotating coils are wound and having the other end forming a sector-shaped lid portion which is opposed against said magnet with the sector-shaped lid portion of said cylindrical core combined; and a plate-like core having a disc-shaped plate body located between the one end of the bar-shaped portion of said bar-shaped core and the opening of said cylindrical core and disposed so as to lid said opening.

15. A valve actuator arrangement for an internal combustion engine as claimed in claim 14, wherein said magnet includes a pair of sector-shaped magnet poles, both poles being formed integrally in a disc plate shape, whose magnetized directions are different with respect to said core member, both of the sector-shaped lid portions of said cylindrical core and the bar-shaped core being formed in sector shapes whose magnetized directions are mutually different.

16. A valve actuator arrangement for an internal combustion engine as claimed in claim 15, wherein said cylindrical core includes an inclined opening formed by cutting the sector-shaped lid portion toward the opening thereof and said cylindrical core is formed such that a thickness size thereof becomes gradually thicker from said opening toward the sector-shaped lid portion.

17. A valve actuator arrangement for an internal combustion engine as claimed in claim 16, wherein each of said cylindrical core, said bar-shaped core is formed of a ferrite series stainless steel.

18. A valve actuator arrangement for an internal combustion engine as claimed in claim 17, which further comprises a plurality of slits which slit an outer peripheral surface of the bar-shaped portion of said bar-shaped core at equal intervals therebetween and which is formed axially on the outer peripheral surface of the bar-shaped portion of said bar-shaped core.

19. A valve actuator arrangement for an internal combustion engine as claimed in claim 18, which further comprises at least one slit formed on the sector-shaped lid portion of said cylindrical core.

20. A valve actuator arrangement for an internal combustion engine as claimed in claim 19, which further comprises at least one slit formed on the sector-shaped lid portion of said bar-shaped core.

21. A valve actuator arrangement for an internal combustion engine as claimed in claim 20, wherein said valve structure is a throttle valve disposed within a throttle chamber of an intake air passage of the engine.

22. A valve actuator arrangement for an internal combustion engine as claimed in claim 21, wherein said forward rotating coil receives a pulse train signal having a fixed frequency and a variable duty ratio and said reverse rotating coil receives another pulse train signal having the fixed frequency and having the same variable duty ratio.

23. A valve actuator arrangement for an internal combustion engine, comprising:

- a valve structure having a valve body and a rotary valve shaft;
- an electric motor structure having a generally disc shaped body fixed on one end of the valve shaft and pivotable with the valve axle;
- a permanent magnet fixed on the disc-shaped body;
- a fixing member fixed on the one end of the valve shaft; and
- a pair of winding coils wound around the fixing member in opposite directions, wherein the direction of a magnetic flux developed between each of the pair of windings and the permanent magnet is parallel to the valve shaft.

* * * * *